(12) United States Patent
Rozak et al.

(10) Patent No.: US 7,984,146 B2
(45) Date of Patent: Jul. 19, 2011

(54) AIRCRAFT HEALTH AND USAGE MONITORING SYSTEM WITH COMPARATIVE FLEET STATISTICS

(75) Inventors: James N. Rozak, Cheshire, CT (US); James P. Cycon, Media, PA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 591 days.

(21) Appl. No.: 11/417,465

(22) Filed: May 4, 2006

(65) Prior Publication Data

US 2007/0260726 A1 Nov. 8, 2007

(51) Int. Cl.
G06F 15/173 (2006.01)
G01M 17/00 (2006.01)
(52) U.S. Cl. .......................... 709/225; 701/29
(58) Field of Classification Search .............. 709/225
See application file for complete search history.

(56) References Cited

U.S. PATENT DOCUMENTS

| | | | |
|---|---|---|---|
| 4,023,409 A | 5/1977 | Durand | |
| 4,300,200 A | 11/1981 | Doe | |
| 4,470,116 A | 9/1984 | Ratchford | |
| 4,574,360 A | 3/1986 | Bateman | |
| 4,702,106 A | 10/1987 | Hassenpflug et al. | |
| 4,780,838 A | 10/1988 | Adelson | |
| 4,794,793 A | 1/1989 | Favre et al. | |
| 4,829,441 A | 5/1989 | Mandle et al. | |
| 4,893,261 A | 1/1990 | Flint, III et al. | |
| 5,063,777 A | 11/1991 | Arethens et al. | |
| 5,121,325 A | 6/1992 | DeJonge | |
| 5,214,596 A | 5/1993 | Muller | |
| 5,225,829 A | 7/1993 | Bateman | |
| 5,229,956 A | 7/1993 | Daniell et al. | |
| 5,239,468 A * | 8/1993 | Sewersky et al. | 701/35 |
| 5,457,634 A | 10/1995 | Chakravarty | |
| 5,475,594 A | 12/1995 | Oder et al. | |
| 5,479,350 A | 12/1995 | Barakchi et al. | |
| 5,552,987 A | 9/1996 | Barger et al. | |
| 6,009,356 A | 12/1999 | Monroe | |
| 6,084,870 A * | 7/2000 | Wooten et al. | 370/349 |
| 6,560,589 B1 | 5/2003 | Stier et al. | |
| 6,591,258 B1 | 7/2003 | Stier et al. | |
| 6,633,742 B1 | 10/2003 | Turner et al. | |
| 6,907,416 B2 | 6/2005 | Tasooji et al. | |
| 6,937,937 B1 * | 8/2005 | Manfred et al. | 702/2 |
| 2003/0149550 A1* | 8/2003 | Famili et al. | 702/188 |
| 2003/0177422 A1* | 9/2003 | Tararoukhine et al. | 714/48 |
| 2004/0217228 A1* | 11/2004 | Scozzafava | 244/6 |

(Continued)

OTHER PUBLICATIONS

U.S. Appl. No. 11/860575, filed Sep. 25, 2007, "Compilation and Distribution of Data for Aircraft Fleet Management".

Primary Examiner — Kenny S Lin
Assistant Examiner — Shaq Taha
(74) Attorney, Agent, or Firm — Carlson Gaskey & Olds PC

(57) ABSTRACT

A Health and Usage Monitoring System (HUMS) utilizes a common architecture which permits OEM and rotorcraft operators to view and trend HUMS data for an entire aircraft fleet independent of aircraft model, HUMS vendor, or raw data format. The system operates through a web portal that provides users with comparative information on HUMS parameters relative to fleet statistics. The user may view HUMS data for the entire fleet or drill down to a particular HUMS acquisition on a specific flight. The web based format also facilities display and communication of warnings in a timely manner.

14 Claims, 27 Drawing Sheets

U.S. PATENT DOCUMENTS

| | | | |
|---|---|---|---|
| 2006/0089761 A1* | 4/2006 | Pettigrew et al. | 701/14 |
| 2007/0130599 A1* | 6/2007 | Monroe | 725/105 |
| 2007/0136078 A1* | 6/2007 | Plante | 705/1 |
| 2007/0168131 A1* | 7/2007 | Root et al. | 702/3 |
| 2007/0219831 A1* | 9/2007 | Ne'meth | 705/4 |
| 2008/0158049 A1* | 7/2008 | Southard et al. | 342/26 R |

* cited by examiner

WEB PAGE MENU FEATURES

LINKS TO EVERY LEVEL OF THE WEB PORTAL

FIGURE 15

FLEET VIEW
PROVIDES GRAPHS ON:
OPERATIONAL USAGE,
RDF'S PROCESSED
TAKEOFFS,
EXCEEDANCES,
REGIMES,
FLIGHT SURVEY,
HUMS PARAMETERS,
MECHANICAL DIAGNOSTICS,
ACCELEROMETERS FOR
THE ENTIRE FLEET OF
AIRCRAFT. DATE AND
PARAMETERS ARE
SELECTABLE.

FIGURES 14, 16

TREND VIEW
PROVIDES STANDARD
TRENDED GRAPHS OM:
BEARING MONITOR UNIT,
ENGINE OIL PRESSURE,
ENGINE TEMPERATURE,
MGB OIL PRESSURE,
MGB TEMPERATURE,
HYDRAULIC TEMPERATURE,
TAIL 1P VIBRATION FOR
THE ENTIRE FLEET OF
AIRCRAFT. DATE, TAIL
NUMBER, MAX/AVG AND
PARAMETERS ARE
SELECTABLE.

FILE PROCESSING
PROVIDES A LIST OF THE LAST
DATA/TIME THAT AN AIRCRAFT
TAIL NUMBERS WAS
PROCESSED INTO THE OLTP
DATABASE.

ALERTS VIEW
PROVIDES A LIST OF ALERTS
AGAINST EACH AIRCRAFT.

S-92A Data Type Details

| TailNo:0003 |
|---|
| Type: REGM |
| Date: 10/23/2005 |
| RDF: All |

| Regime Name <Time Sequence> | Count | Flt Hrs | Percentage |
|---|---|---|---|
| 41:Foorward Flight to 0.9 Vne | 3 | 2.476 | 65.34 |
| 01:APU Power, No Rotors Turning | 6 | 0.308 | 8.14 |
| 02:Ground Run | 5 | 0.166 | 4.37 |
| 91:Undetermined | 7 | 0.145 | 3.82 |
| 03:Aircraft Taxi | 14 | 0.136 | 3.59 |
| 40:Forward Flight to 0.8 Vne | 8 | 0.134 | 3.54 |
| 43:Steady Climb | 9 | 0.126 | 3.33 |
| 48:Partial Power Descent to 0.9 | 3 | 0.08 | 2.11 |
| 47:Partial Power Descent to 0.8 | 5 | 0.043 | 1.14 |
| 11:Hover in Ground Effect | 11 | 0.036 | 0.96 |
| 05:Right Taxi Turn | 5 | 0.028 | 0.75 |
| 39:Forward Flight to 0.5 Vne | 5 | 0.024 | 0.62 |
| 04:Left Taxi Turn | 5 | 0.014 | 0.38 |
| 21:Low Speed Forward Flight | 3 | 0.012 | 0.31 |
| 77:Generic Level Left Turn, 30d | 2 | 0.009 | 0.24 |
| 46:Partial Power Descent to 0.5 | 3 | 0.009 | 0.24 |
| 22:Approach | 3 | 0.008 | 0.22 |
| 53:Dive to 1.0 Vne | 3 | 0.007 | 0.18 |
| 19:Rearward Flight, 10-25Kts | 1 | 0.004 | 0.11 |
| 52:Partial Power Descent Left T | 3 | 0.004 | 0.1 |
| 89:Takeoff Transition | 5 | 0.003 | 0.09 |
| 44:Right Turn During Climb | 1 | 0.003 | 0.08 |
| 45:Left Turn During Climb | 1 | 0.003 | 0.08 |
| 08:Normal Landing | 2 | 0.002 | 0.06 |
| 06:Lift to Hover (Vertical Take) | 2 | 0.002 | 0.06 |
| 34:Low Speed Climb | 4 | 0.002 | 0.04 |
| 33:Low Speed Descent | 2 | 0.001 | 0.03 |
| 14:Descent in Hover | 2 | 0.001 | 0.02 |
| 76-81:Generic Level Left Turn | 1 | 0.001 | 0.02 |
| 13:Ascent in Hover | 1 | 0 | 0.01 |

▷ Back
▷ Return to Top

| | | | | | | |
|---|---|---|---|---|---|---|

RTB Track Summary
File:78286.S-92A.0004.20051031T175121,130Z.RDF

Details - 0004

| RDF | | Gnd | Hvr | 80 Kts | 120 Kts | 140 Kts | 150 Kts |
|---|---|---|---|---|---|---|---|
| 10/31/2005 05:51:21 PM | | 2 | 3 | 0 | 1 | 0 | 0 |

| Relative Track | Blu (mm) | Red (mm) | Blk (mm) | Yel (mm) |
|---|---|---|---|---|
| Gnd | -4 | -9 | -2 | 16 |
| Hvr | -22 | 17 | -14 | 19 |
| Kts-120 | 18 | 17 | -22 | -13 |

| Trach Std Dev | Blu (mm) | Red (mm) | Blk (mm) | Yel (mm) |
|---|---|---|---|---|
| Gnd | 24 | 22 | 25 | 24 |
| Hvr | 24 | 25 | 25 | 25 |
| Kts-120 | 28 | 29 | 30 | 29 |

| Relative Lag | Blu (mm) | Red (mm) | Blk (mm) | Yel (mm) |
|---|---|---|---|---|
| Gnd | -7 | 14 | 7 | -15 |
| Hvr | 24 | -17 | 33 | -41 |
| Kts-120 | -2 | 2 | 19 | -19 |

| Lag Std Dev | Blu (mm) | Red (mm) | Blk (mm) | Yel (mm) |
|---|---|---|---|---|
| Gnd | 6 | 6 | 6 | 6 |
| Hvr | 11 | 16 | 15 | 14 |
| Kts-120 | 10 | 11 | 11 | 13 |

| Absolute Lag | Blu (mm) | Red (mm) | Blk (mm) | Yel (mm) |
|---|---|---|---|---|
| Gnd | -0.69 | -0.83 | -0.78 | -0.63 |
| Hvr | 6.53 | 6.81 | 6.47 | 6.97 |
| Kts-120 | 5.55 | 5.52 | 5.41 | 5.66 |

| Lag Std Dev | Blu (mm) | Red (mm) | Blk (mm) | Yel (mm) |
|---|---|---|---|---|
| Gnd | 0.0371 | | 0.0367 | 0.042 |
| Hvr | 0.0757 | | 0.1018 | 0.0955 |
| Kts-120 | 0.0639 | | 0.0719 | 0.0854 |

▶ Back
▶ Return to Top

AIRCRAFT HEALTH AND USAGE MONITORING SYSTEM WITH COMPARATIVE FLEET STATISTICS

BACKGROUND OF THE INVENTION

The present invention relates to an aircraft Health and Usage Monitoring Systems (HUMS) and more particularly the provision of HUMS services through a web portal that provides comparative information on HUMS parameters relative to fleet statistics.

Health and Usage Monitoring Systems (HUMS) are installed on various aircraft to monitor the health of critical components and collect operational flight data utilizing on-board accelerometers, sensors, and avionic systems. The on-board data is then transferred from the aircraft to a ground station to be viewed by an end-user.

A typical HUMS collects over 12 Megabits of data in a one-hour flight. The data may be a mix of raw parameters, discrete events, and calculated values. Conventional HUMS are vendor specific and are focused at viewing data from an individual aircraft over only a relatively limited time span, typically a few weeks to a few months. Conventional HUMS ground stations are also limited to the data collected by their own associated on-board system as data is often organized and stored differently depending on the HUMS manufacturer. This requires the end-user to have a ground station unique to the particular HUMS vendor to view that particular HUMS data. Vendor ground stations also have different graphical interfaces and features which may increase the workload of an end-user with a multitude of aircraft types.

Accordingly, it is desirable to provide a HUMS Service which collects, processes, analyzes and applies rule based logic to large amounts of HUMS data over prolonged periods of time to collate individual aircraft HUMS data into trendable HUMS data across an aircraft fleet.

SUMMARY OF THE INVENTION

A Health and Usage Monitoring System (HUMS) Service according to the present invention provides the ability to automatically collect, process, analyze and apply rule based logic to large amounts of HUMS data to transform that data into useful information that can be acted upon to proactively support helicopter operations and reduce maintenance and logistics cost. The system utilizes a common architecture which permits OEM and rotorcraft operators to view and trend HUMS data for an entire aircraft fleet.

The system operates through a web portal that provides customers with comparative information on HUMS parameters relative to fleet statistics. The user may view HUMS data for the entire fleet or drill down to a particular HUMS acquisition on a specific flight. The web based format also facilities timely warning display.

The present invention therefore provides a HUMS Service which collects, processes, analyzes and applies rule based logic to large amounts of HUMS data over prolonged periods of time to collate individual aircraft HUMS data into trend HUMS data across an aircraft fleet.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 5 is a web portal 14 day overview page;

FIG. 8 is a web portal daily report page;

FIG. 9 is a web portal by tail number for an entire month;

FIG. 12 is a web portal detail of regimes for an aircraft and date page;

FIG. 13 is a web portal regime acquisition view page;

FIG. 14 is a web portal RTB vibration and track summary acquisition count page;

FIG. 15 is a web portal RTB vibration 1-8P amplitude and phase page;

FIG. 16 is a web portal trend chart page;

FIG. 17 is a RTB track summary data page; and

FIG. 18 is a detailed acquisition page of RTB track data.

DETAILED DESCRIPTION OF THE PREFERRED EMBODIMENT

Figure 1A:
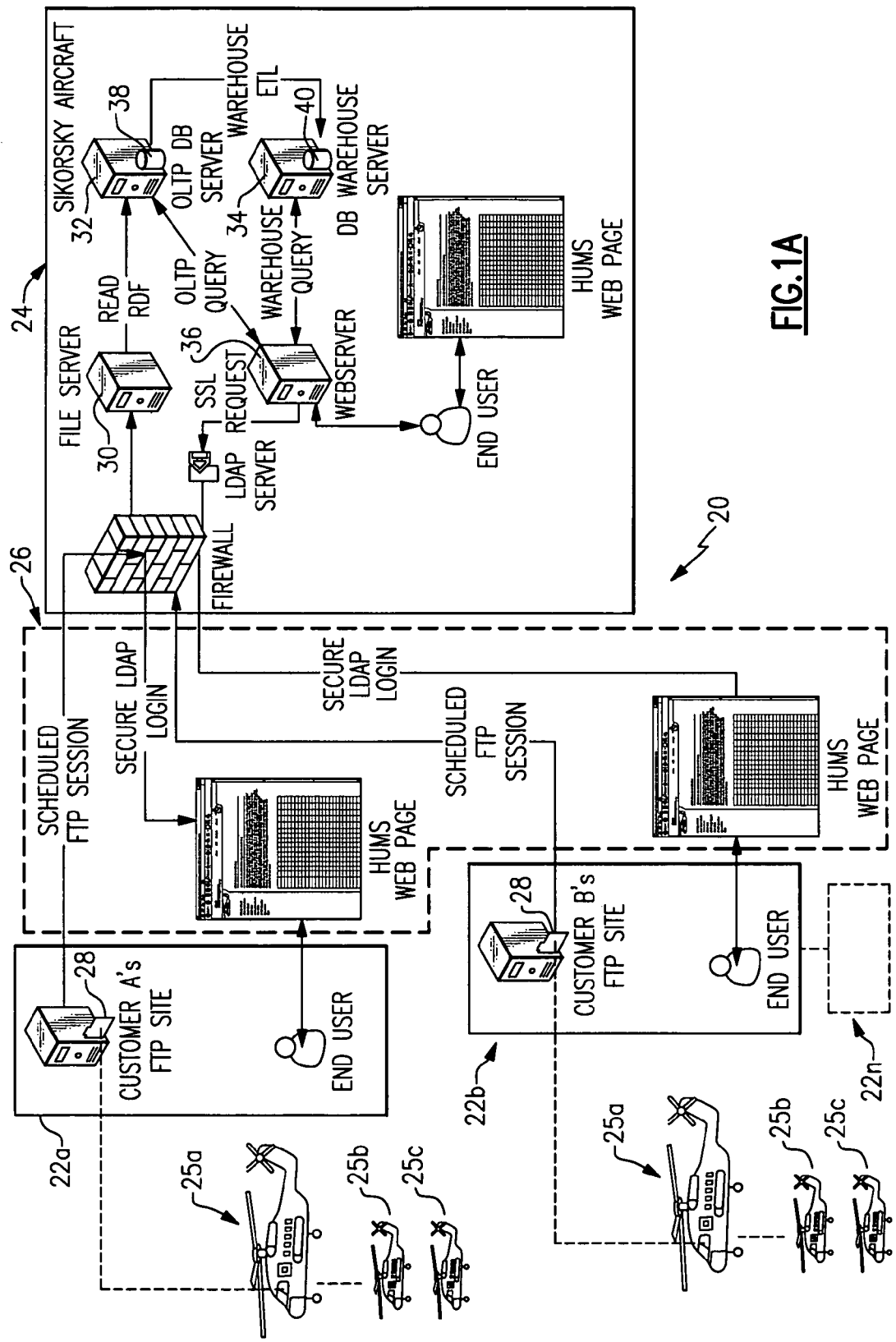
FIG. 1A is a schematic view of a HUMS Service according to the present invention.
Figure 1B:
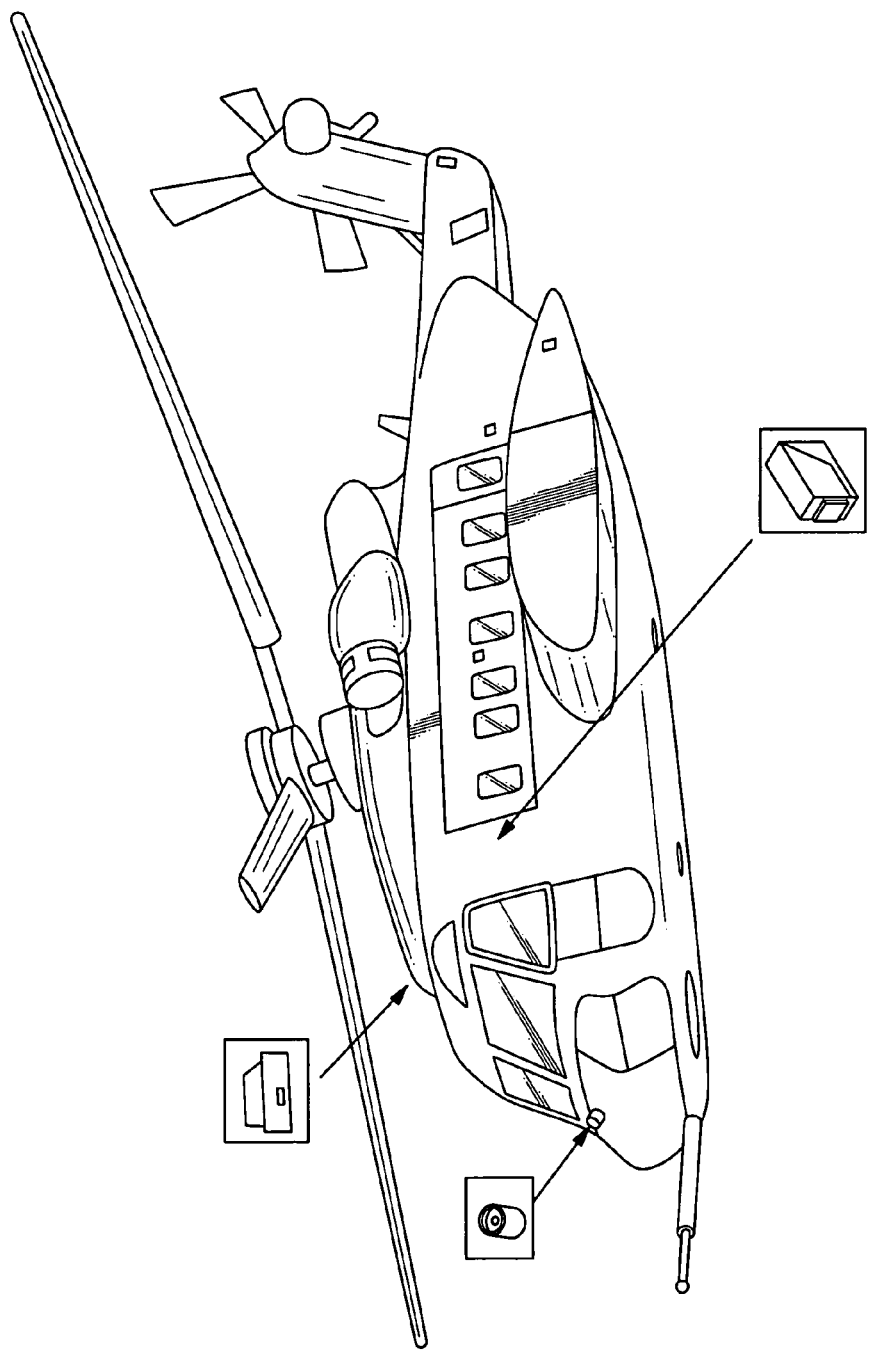
FIG. 1B is a phantom view of an exemplary rotor craft illustrating a multitude of HUMS data collection sensors.
Figure 1C:
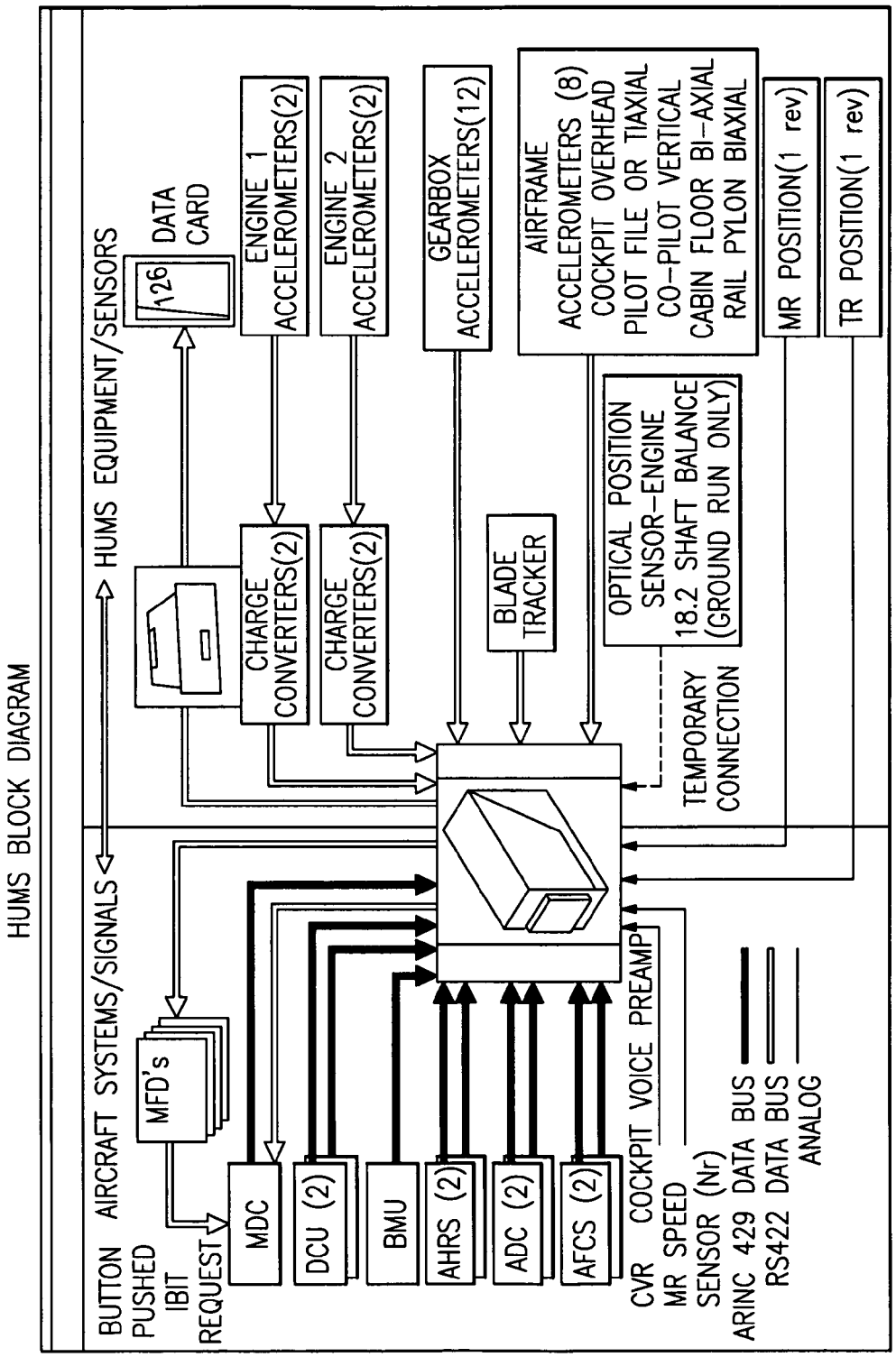
FIG. 1C is a diagram which illustrates that a HUMS gathers data from various aircraft avionic subsystems as well as sensors located through out the rotorcraft.

FIG. 1 schematically illustrates a Health and Usage Monitoring System (HUMS) Service 20 in a block diagram format. The HUMS Service 20 interconnects any number of user FTP sites 22a-22n with an aircraft OEM 24 through a communication system 26 such as the internet or the like. It should be understood that various communication systems 26 are usable with the present invention. Furthermore, each user may be a single aircraft operator or the operator of a fleet of aircraft.

Each user 22a-22n initially collects HUMS data from each of a multitude of aircraft 25a-25n in an aircraft removable data storage device 28 which communicates with a multitude of sensors, avionic subsystems, and other data collection device on each aircraft 25 (illustrated schematically in FIGS. 1B&C) as generally known. The aircraft removable data storage device 28 is then removed from the aircraft 25a-25n and the HUMS Raw Data File (RDF) data therein is uploaded to the users FTP site 22a-22n. It should be understood that the collection of HUMS data from each aircraft and uploading is as generally understood for a conventional HUMS ground station. Here, however, the "ground station" is an FTP site 22a-22n which connects each user with the aircraft OEM 24.

The HUMS data uploaded to each FTP site 22a-22n is collected from each user on a regular basis and uploaded to an OEM file server 30 at the aircraft OEM 24. The OEM file server 30 communicates with an on-line transactional database server (OLTP data base server) 32 which is in communication with an OEM warehouse server 34 and an OEM webserver 36. It should be understood that various server systems will also be usable with the present invention and that the illustrated embodiment of server systems are for descriptive purposed only.

Figure 3:
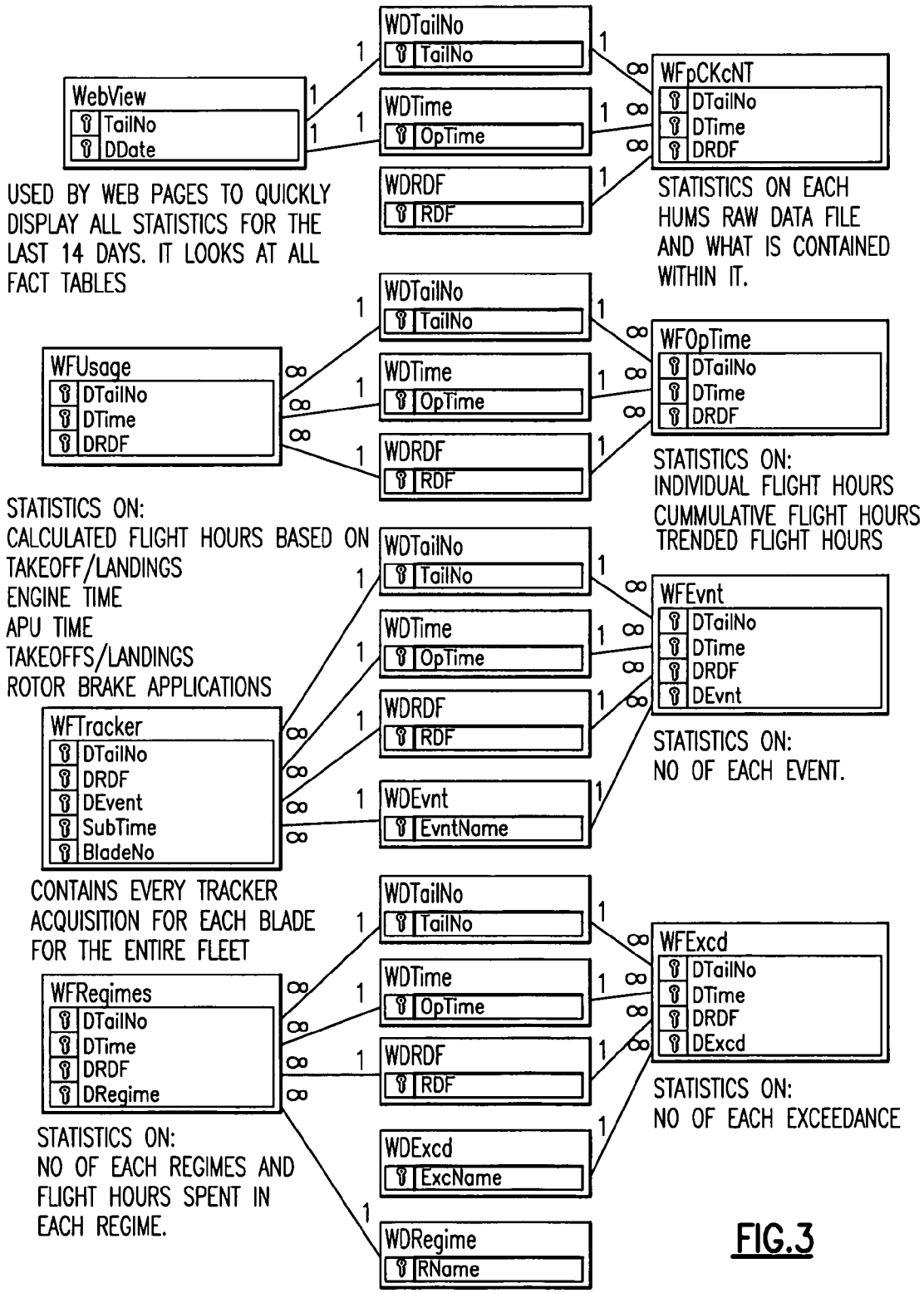
FIG. 3 is a data base schema for use with the HUMS according to the present invention.
Figure 3:
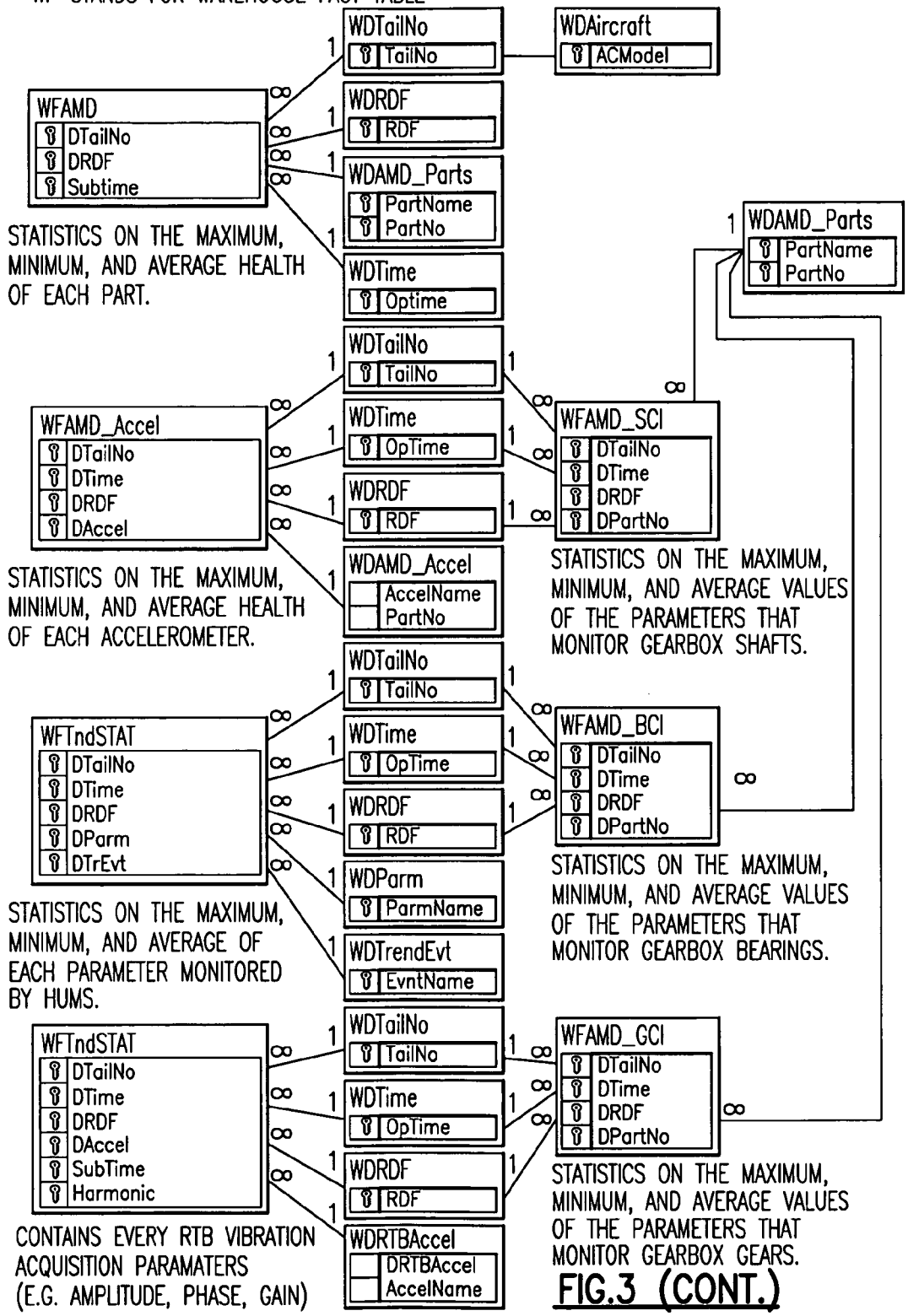

The file server 30 receives the HUMS data and converts the HUMS data to a common HUMS data format for storage in an OLTP database 38 stored on the OLTP 32. That is, the various data formats utilized by each user are processed into a common format. For example, HUMS events are stored into an events table and HUMS exceedances are stored in an exceedence table (FIG. 3). The system 20 provides several ways (e.g. rule-based logic) to digest the analyzed data to create information that is displayed at a top-level page. Rules may be created based on discrepancies or anomalies relative to fleet statistics or OEM based design assumptions (e.g. number of takeoffs does not equal landings or rate of change on a monitored parameter is greater than fleet average). Logic rules are applied to the fact tables to produce higher-level information for notification of potential problems or issues (Alerts) during the transformation process from the OLTP database server 32 to the OEM warehouse server 34. It should be understood that various tables may be usable with the present invention and that different logic concepts (Such as neural network, fuzzy logic, etc) can be incorporated or utilized to produce higher level fleet information.

Figure 2:
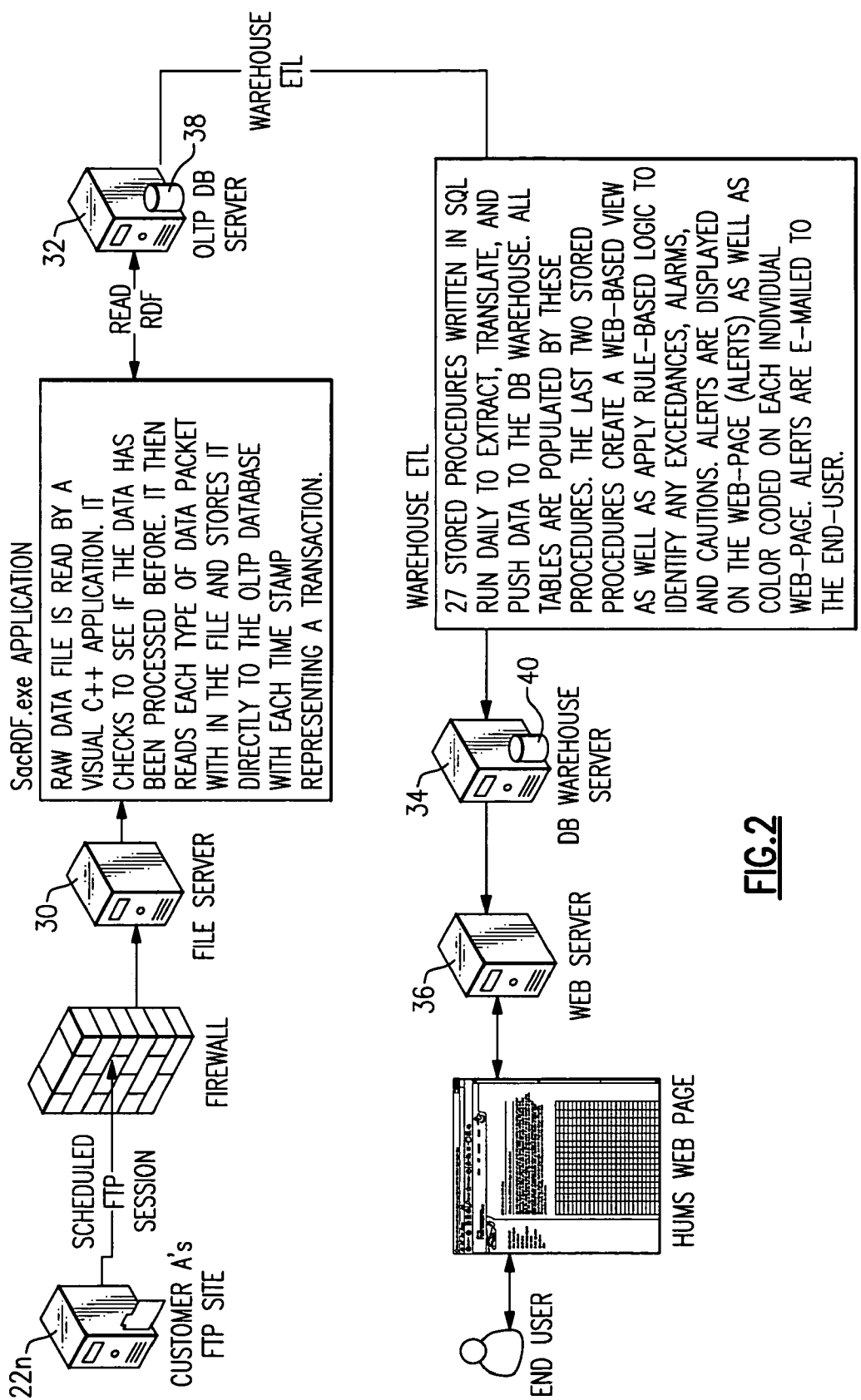
FIG. 2 is a schematic view of a single customer FTP site interaction with the HUMS Service according to the present invention.

The uploaded data is then processed with, for example only, a series of SQL scripts which calculate statistics utilizing the uploaded data in the OLTP database server 32 and then stores the raw HUMS data onto a warehouse database 40 on the OEM database server 34 (FIG. 2). That is, the HUMS data file is maintained within the OEM database server 34 while the OLTP database server 32 stores the calculated statistics therefrom in the OLTP database 38. Statistics may be calculated for each of a multitude of fact tables (FIG. 3).

The fact tables are related to the common features of HUMS system data and preferably accommodate data from different aircraft models as well as different HUMS vendors. Such processing permits each user to view the calculated statistics utilizing all aircraft from all users to identify trend HUMS data across the entire aircraft fleet yet assures that the RDF from aircraft owned by a particular user is only available to that particular user. Individual aircraft may thereby benefit from comparative information on HUMS parameters relative to fleet statistics such that the data may be acted upon to proactively support individual aircraft operations and maintenance. Each user can view the data from a fleet prospective as well as drill down to a single HUMS acquisition on a particular flight for their aircraft while the aircraft OEM has access to all information for the entire fleet.

The system 20 notifies a user a top level when a potential problem or issue that has been identified and what action needs to be taken. This allows the user, engineer, aircraft maintainer, or pilot the ability to comprehend significant quantities of fleet wide HUMS data with minimum investigation. By utilizing fleet data and statistical analysis the system 20 improves and refines user alerts such that earlier detection of potential problems is readily achieved.

Referring to FIG. 3, a schema for the warehouse database 40 is illustrated. The warehouse database 40 is a multi-dimensional view data table transactional database that provides a common platform to draw the stored HUMS data. The warehouse database 40 includes dimensional tables (WD_) and fact tables (WF_). The multi-dimensional data tables provide a structure through which the fact tables may be viewed. The fact tables which contain the common HUMS data format are stored in the OLTP database 38.

Generally then, the OEM webserver 36 handles all higher level queries to provide summary data views by aircraft tail number, date/time, raw data file, parameter/part name or other characteristics. The web portal, at the lowest drill-down level provides the user with the HUMS data acquisition level by specific OLTP query of the OLTP database 38. Furthermore, raw HUMS data is available through a warehouse query of the warehouse database 40 of the OEM warehouse server 34.

Figure 4:
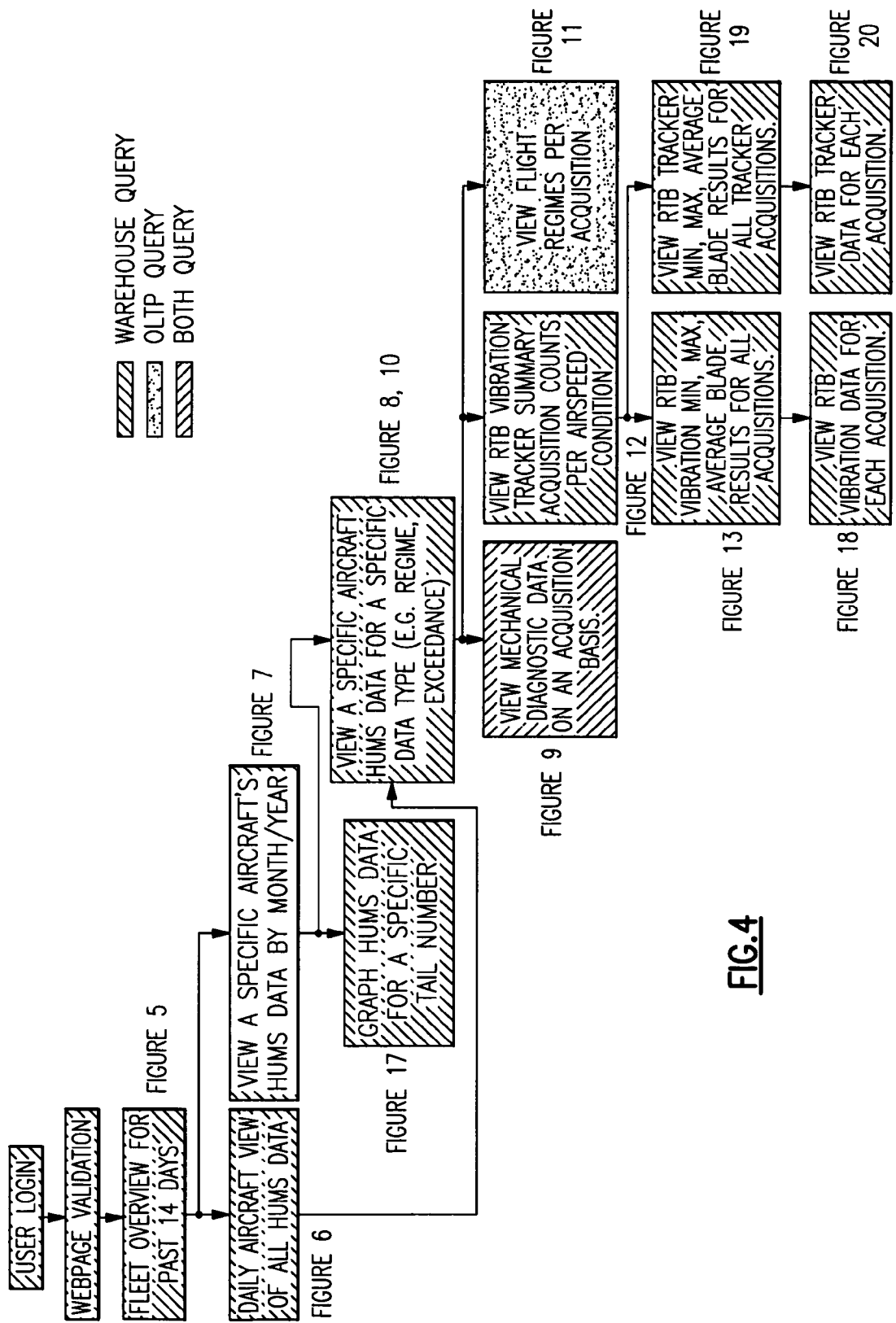
FIG. 4 is a flow chart illustrating the web page hierarchy of the HUMS.

Referring to FIG. 4, the webpage hierarchy provide a series of WebPages to permit communication with the warehouse database 40 as well as the OLTP database 38 so as to present the HUMS data to the end user. The alerts are displayed to the user through a webpage hierarchy as well as color coded on individual pages as a green, yellow, red indication. Alerts may be e-mailed to users as well.

The system 20 architecture is structured such that the Fleet Manager or aircraft OEM can evaluate all the HUMS data across an aircraft fleet while each end-user can evaluate the raw HUMS data for only it own aircraft. The system 20 architecture also limits access such that user cannot review raw HUMS data from other end-users aircraft but do have access to fleet trends and statistics for comparison purposes. This is accomplished by overlaying a filter to the data warehouse 36 in response to user login (FIG. 2).

Figure 5:
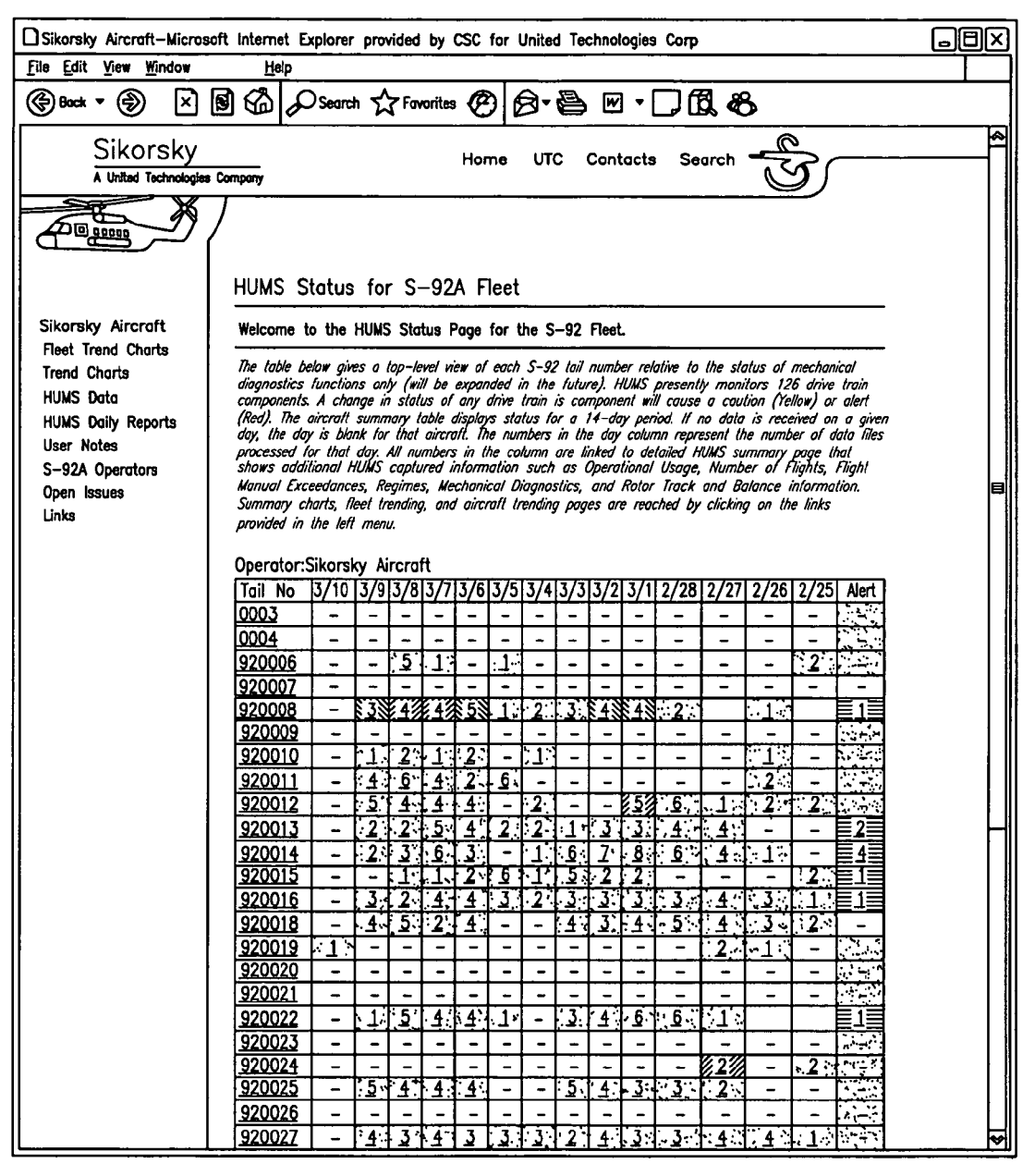

Referring to FIG. 5, the first page of the web portal as provided by the webserver 36 provides aircraft fleet activity for the last 14-days. Each day is color coded so the user can quickly see the state of all aircraft. If any day is red immediate action is required, yellow denotes an anomaly has been detected and should be investigated. The numeral associated with each day indicates the number of HUMS data files collected on that day. Blank days mean no flights were performed that day. Clicking on a particular day permits a user to drill-down to the daily flight page (FIG. 6) which provides specific flight information for that aircraft on that day. If a problem has been identified details of the issue are provided in the daily flight page. A key feature is it shows (color coded) if there is a caution or warning on mechanical diagnostics or exceedances. The watch column indicates the number of parameters that are trending above a statistical normal. Each item has a hyperlink to display further information. For example, when a user clicks on an alert in the alert column the page shown in FIG. 6*a* appears.

Figure 6A:
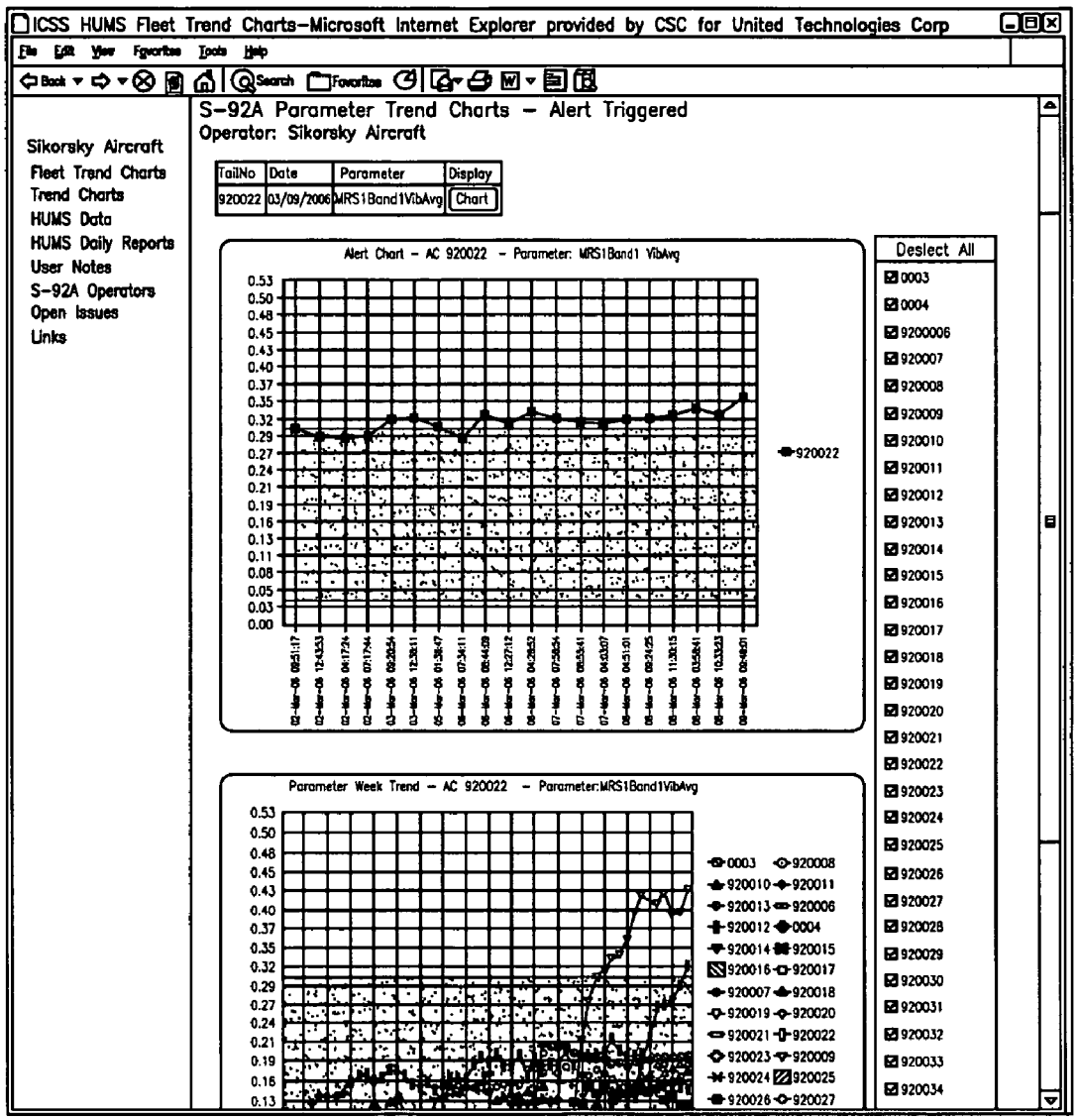
FIGS. 6A and 6B are Fleet-wide Alerts and Trend Charts for key parameters.
Figure 6B:
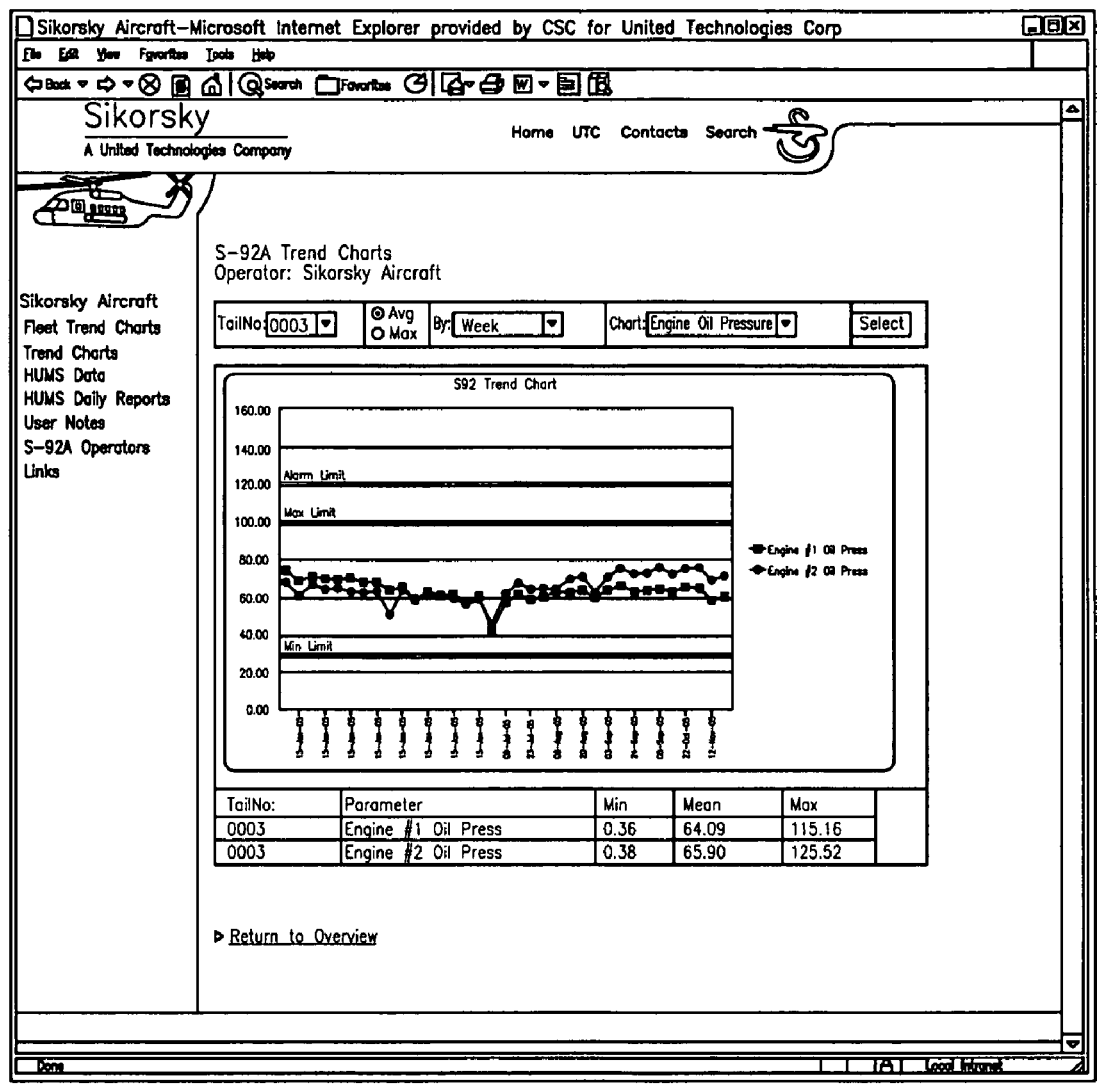
Figure 7A:
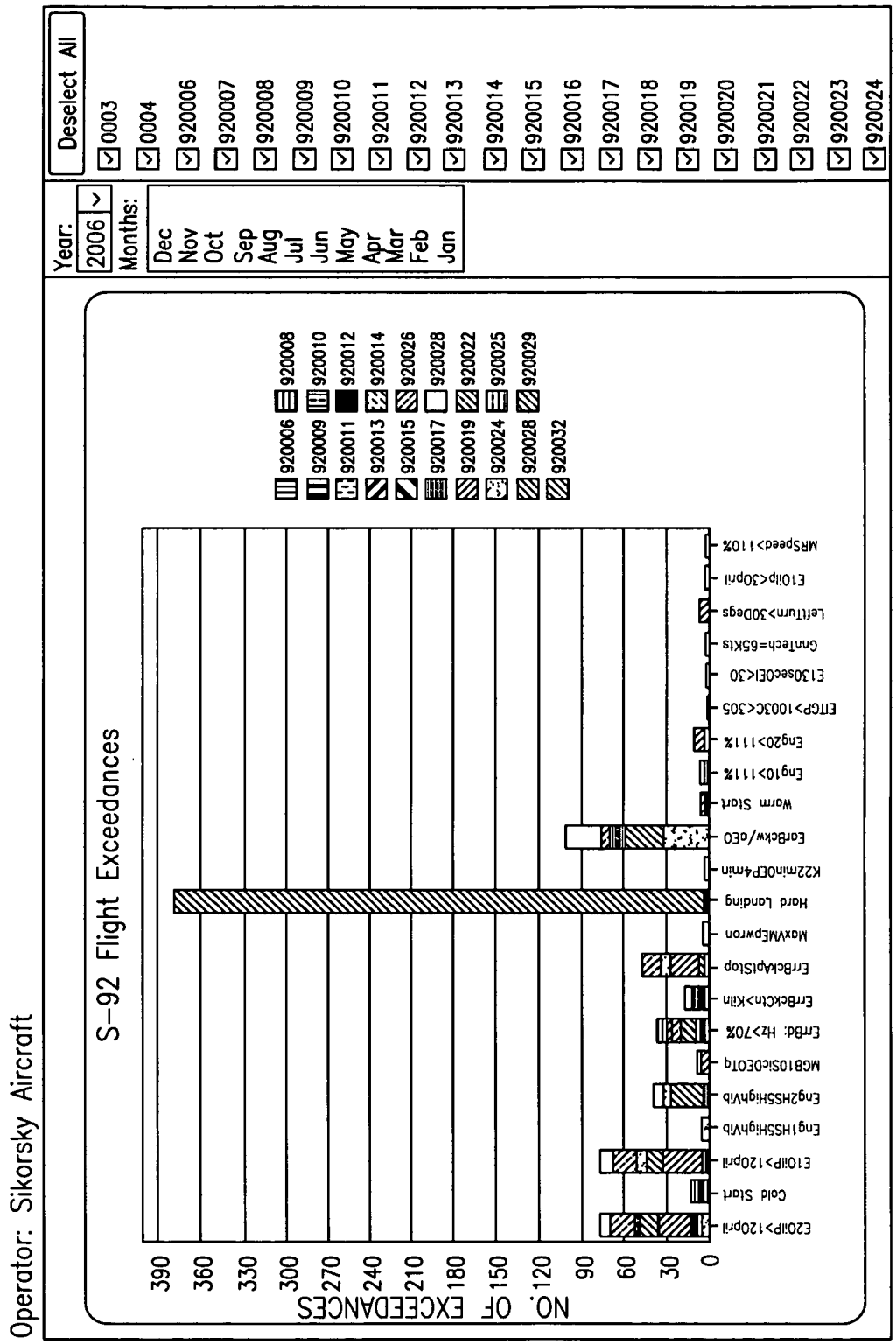
FIGS. 7A-7F are Fleet-wide charts for Operational Usage, Exceedances, Regimes, and Parameters.
Figure 7B:
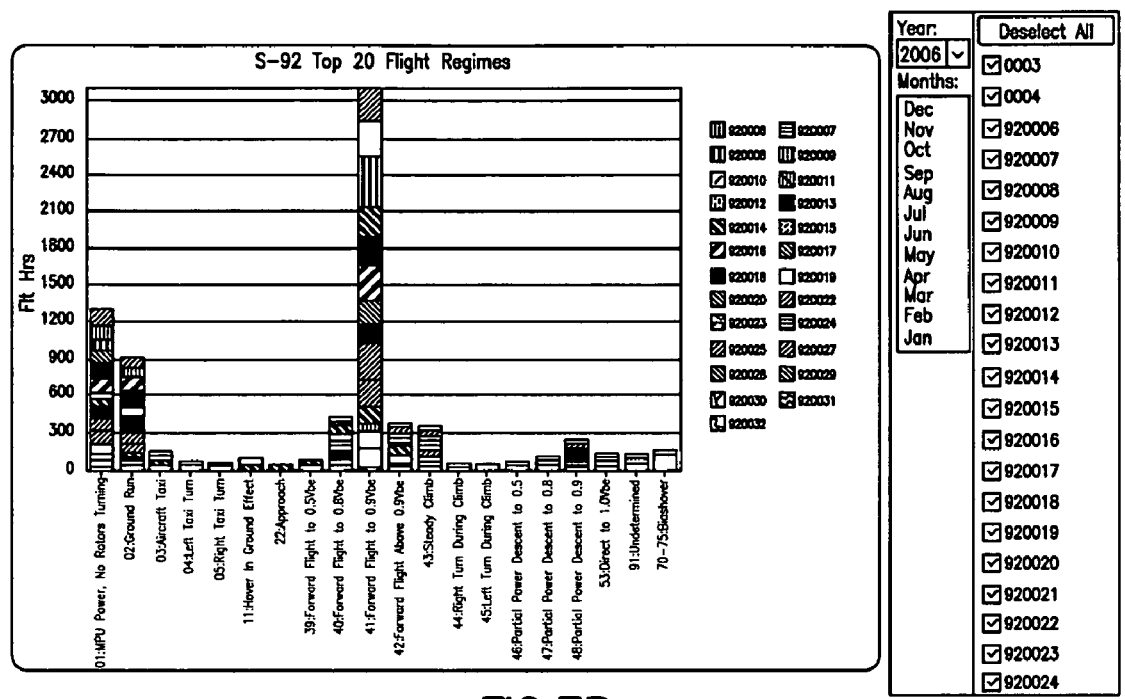
Figure 7C:
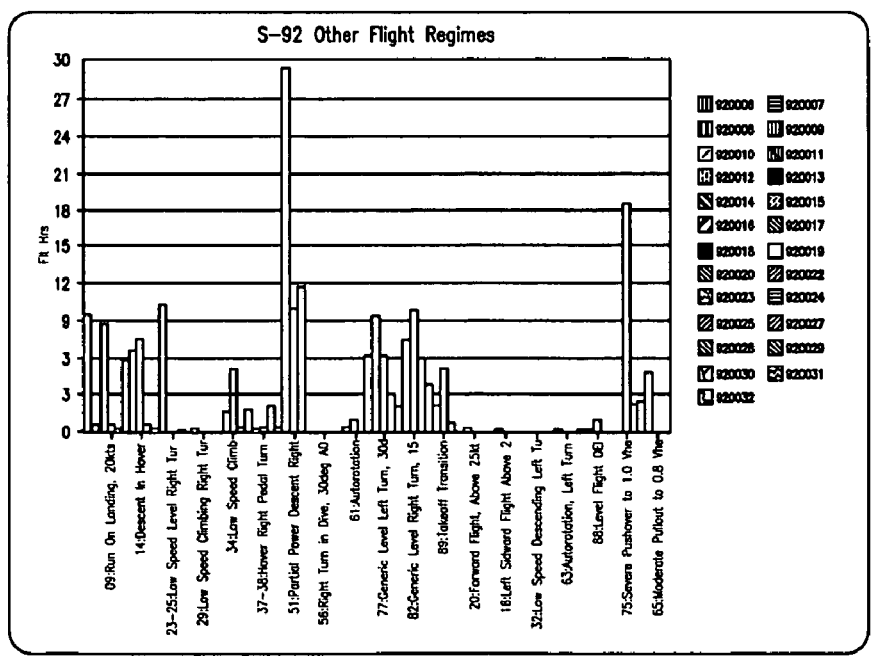
Figure 7D:
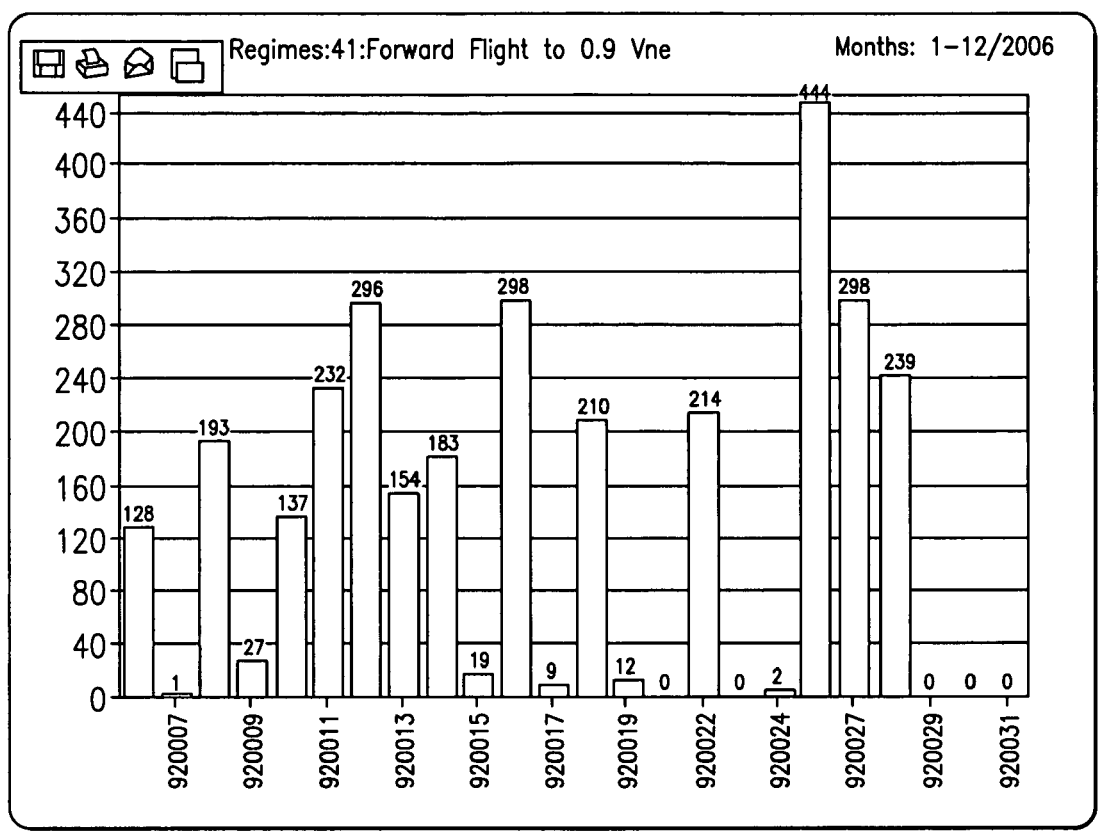
Figure 7E:
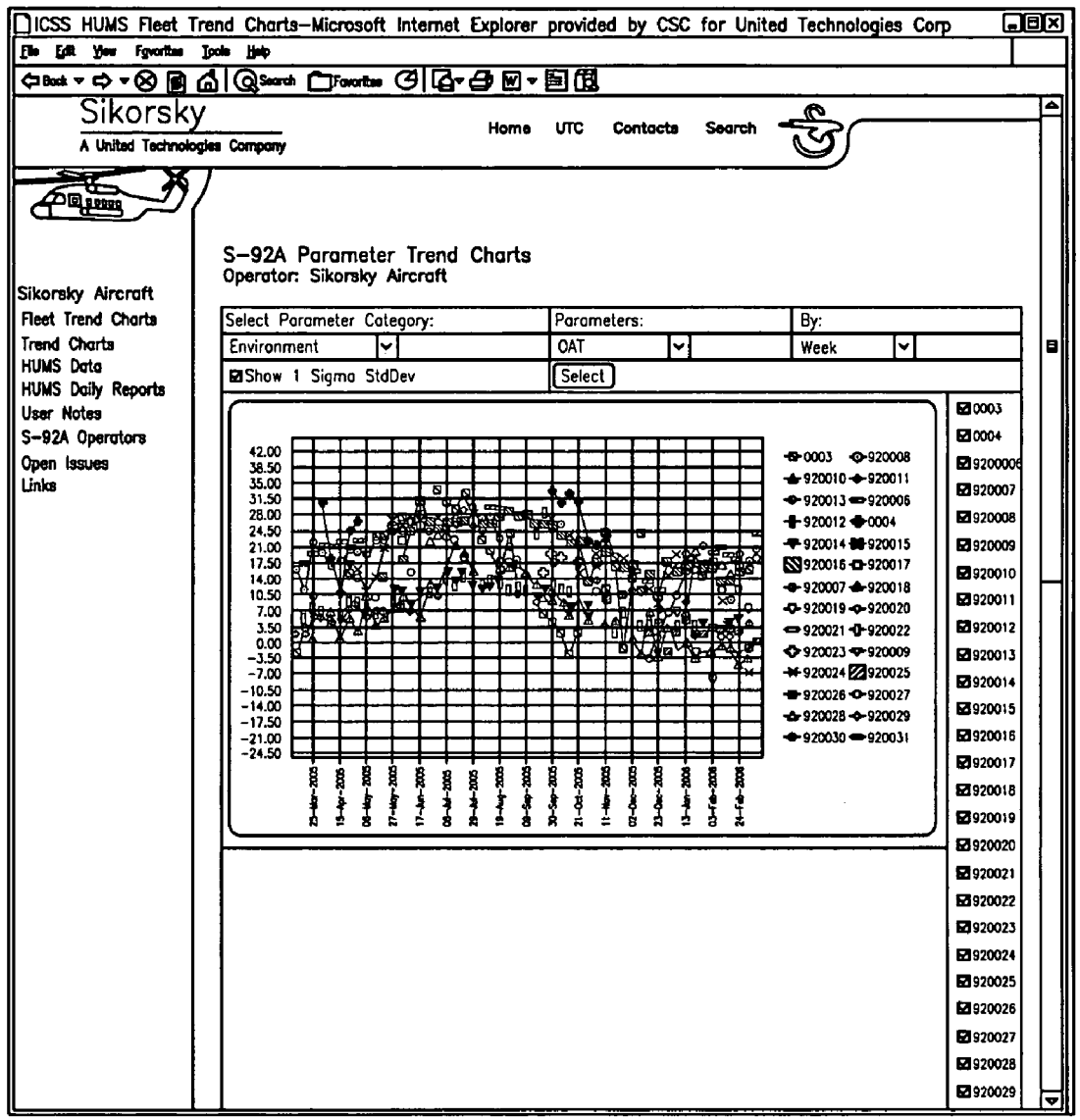
Figure 7F:
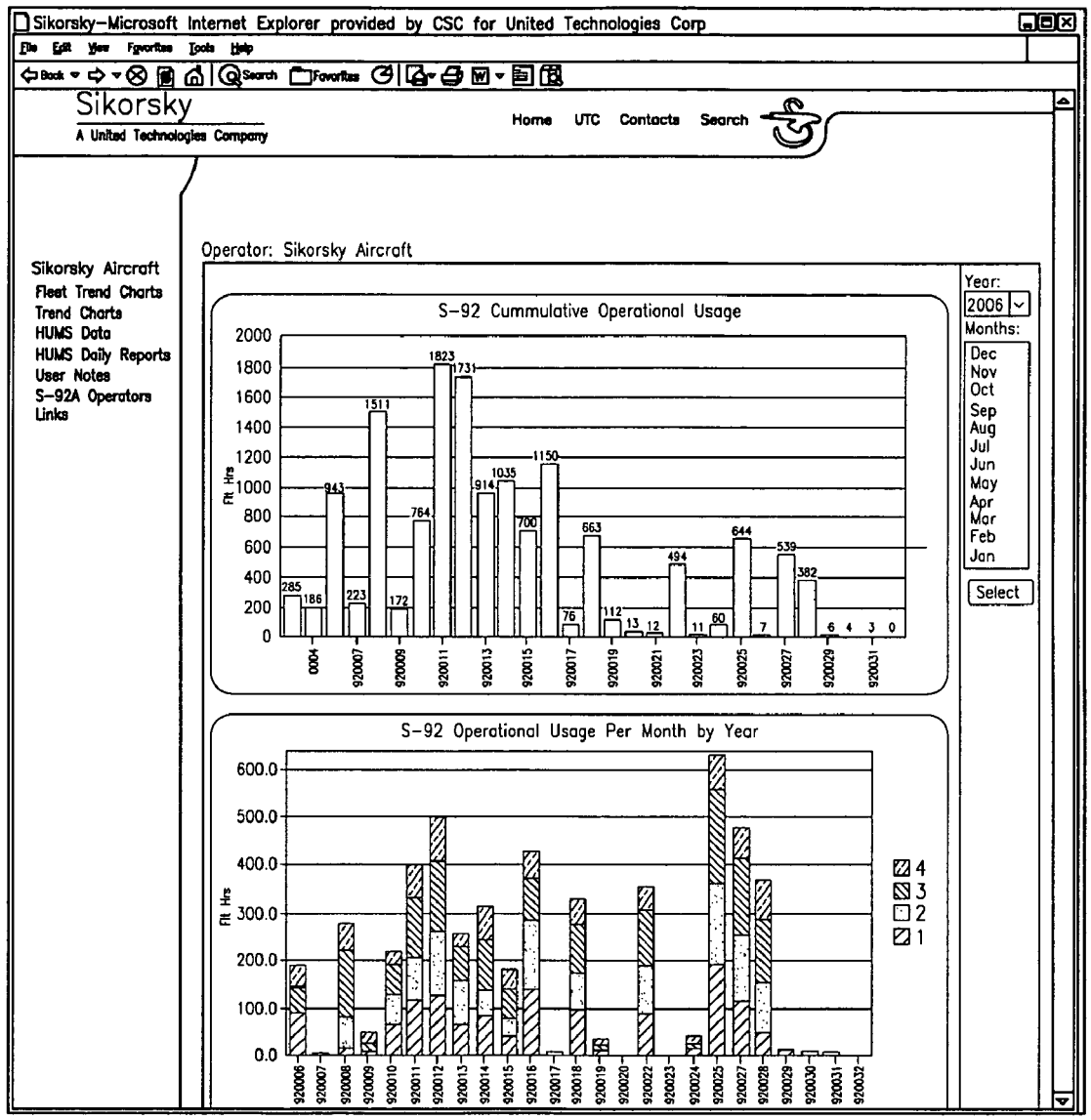

Referring to FIG. 6, a Trend Alerts page (FIG. 6*a*) is accessed by selecting from within the Watch column from the summary page (FIG. 5). This page shows which parameters are trending above the statistical norm and displays them to the end-user. In the illustrated example, the first chart shows a week's worth of data around the time of the last statistical exceedance. The chart below allows the end-user a view of the same parameter but in a fleet-wide view to see how its aircraft are performing against other aircraft. The end-user has the ability to select or de-select tail numbers to group like customers. FIG. 6*b* illustrates one of the Trend Charts for the fleet of aircraft. As illustrated, for example, Engine Oil pressure may be viewed and trended. Trend charts provide rapid access to parameter trends that are frequently viewed and have hard limits as defined by, for example, the aircraft maintenance schedule and flight manual. This page allows the end-user to view maximum and average data by week, current week, month, and year. Below the chart, it provides the end-user with a table illustrating the min, max and average for this parameter by tail number.

Referring to FIG. 7, a Web Portal Trend Chart page is accessed by selecting "Trend Charts" from the menu on the left side of the page. There are several trend charts available to the end-user. Fleet Trending available to all end-users is illustrated. The fleet trending charts are an important part of the architecture because fleet trending facilitates the identification of anomalies and differences between aircraft (also see FIG. 4). FIG. 7a illustrates the exceedance encountered by the fleet of aircraft. FIG. 7b-d illustrates the regimes flown by the fleet. Fleet Trend Charts are accessed by selecting Fleet Trend Charts->Regimes from the menu on the left side of the page. This view displays the flight regimes that where flown graphically. The end-user can select one to all tail numbers to over plot as well as select the year or a subset of the year. The Fleet parameter page is accessed by selecting Fleet Trend Charts->Parameters from the menu on the left side of the page. The end-user selects a Parameter Category (e.g. Environment) which populates a pull-down box with a subset of parameters for that category. The end-user selects a parameter to chart (e.g., OAT). The end-user can view the data by week, month, year or current week (e.g., week). The end-user can also select and de-select tail numbers to view on the chart on the right-hand menu. The shaded band represents a 1 sigma statistical band of the data to be used in alert limits. This page provides a fleet view of the data. This page also provides a table (not shown in this figure) with the min, max, and mean for this parameter for each tail number which allows the end-user to quickly find data points that are out-of-range.

Figure 8:
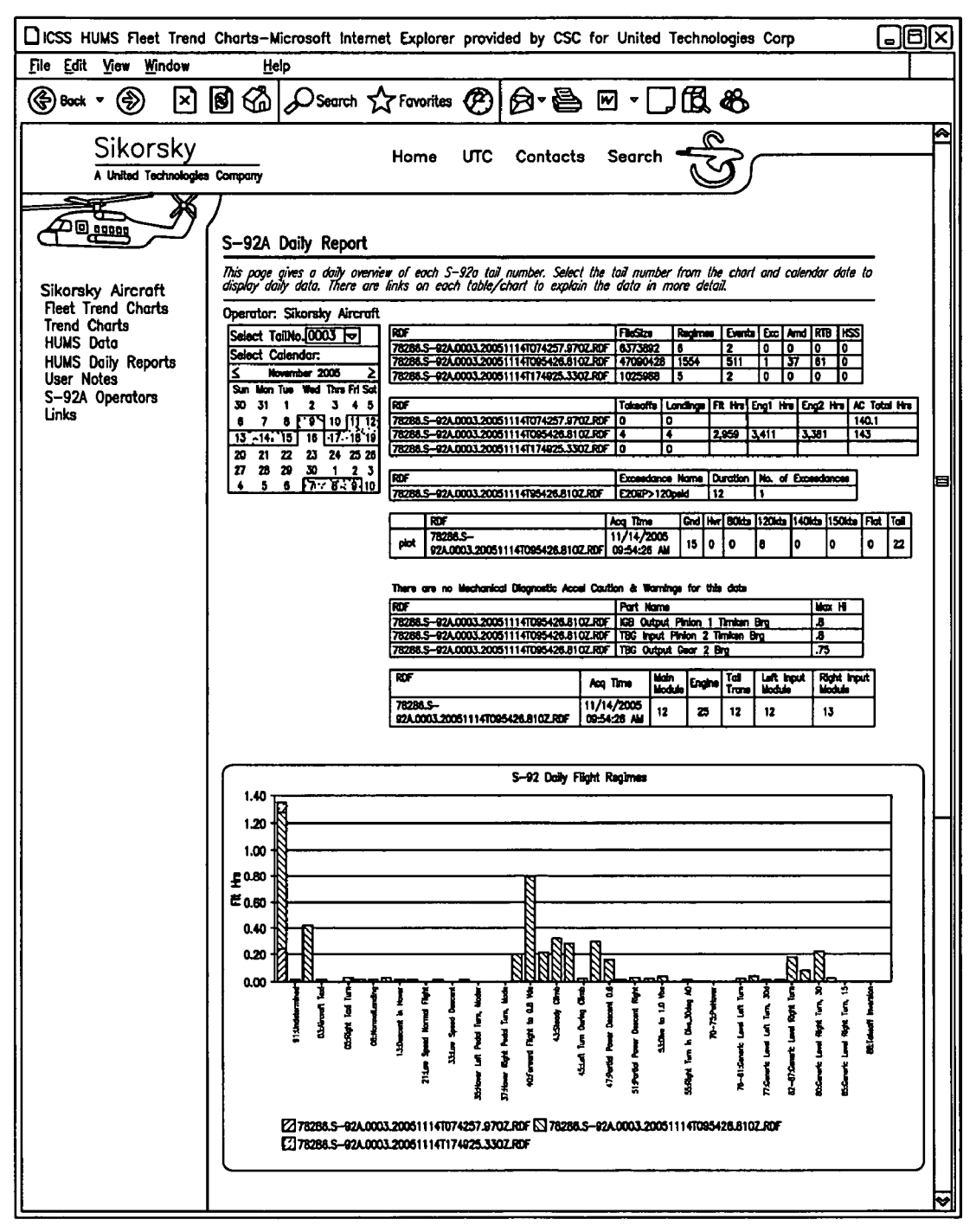

Referring to FIG. 8, a Web Portal Daily Report page provides the end-user an overview (starting from the top table and going down) of file data, operational usage, exceedances, number of RTB acquisitions, mechanical diagnostics, number of mechanical diagnostic acquisitions, and summary of the flight regimes flown for the day by data file. Notably, the illustrated daily report is for aircraft tail no. 0003 for the calendar days of November 9, 11-15, and 17-19.

Figure 9:
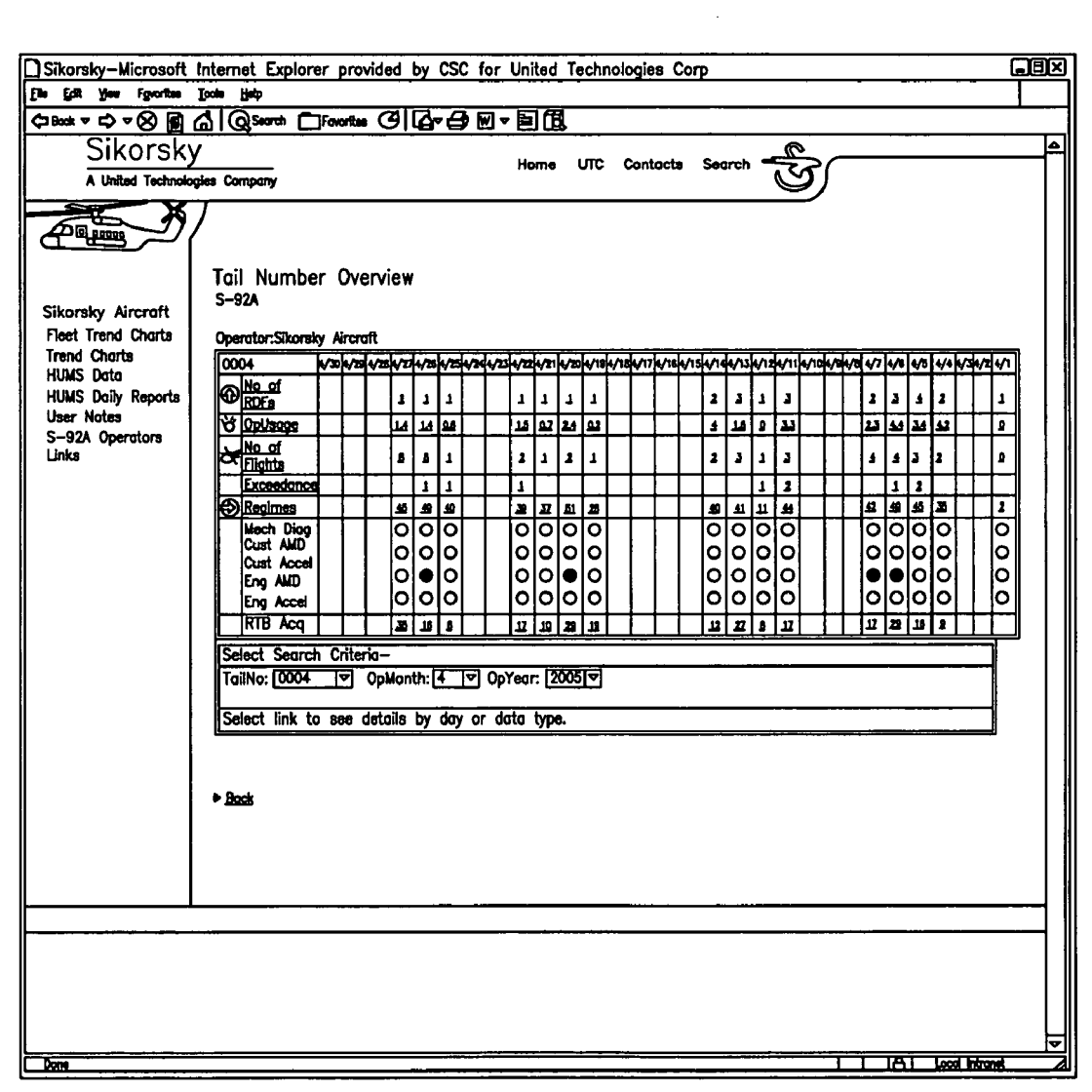

Referring to FIG. 9, a Web Portal by Tail Number for entire Month page allows the end-user to display a summary of key HUMS functions on a daily basis for the month. The end-user can select Tail number, Operational Month, and Operational Year. Each item has a hyperlink so the end-user can view more detailed information for that function (FIGS. 8, 10 & 11).

Figure 10:
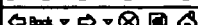
FIG. 10 is a web portal detail page showing mechanical diagnostic health.

Referring to FIG. 10, of Mechanical Diagnostic Health Web Portal Detail Page provides a color coded caution or warning for mechanical diagnostics. The end-user is thereby provided with a component advisory review. For example only, the advisory may be reviewed by a particular Tail No, date, or other function. An end-user need only select the hyperlink on the Part Name to view the condition indicators that caused the advisory (FIG. 11).

Figure 11:
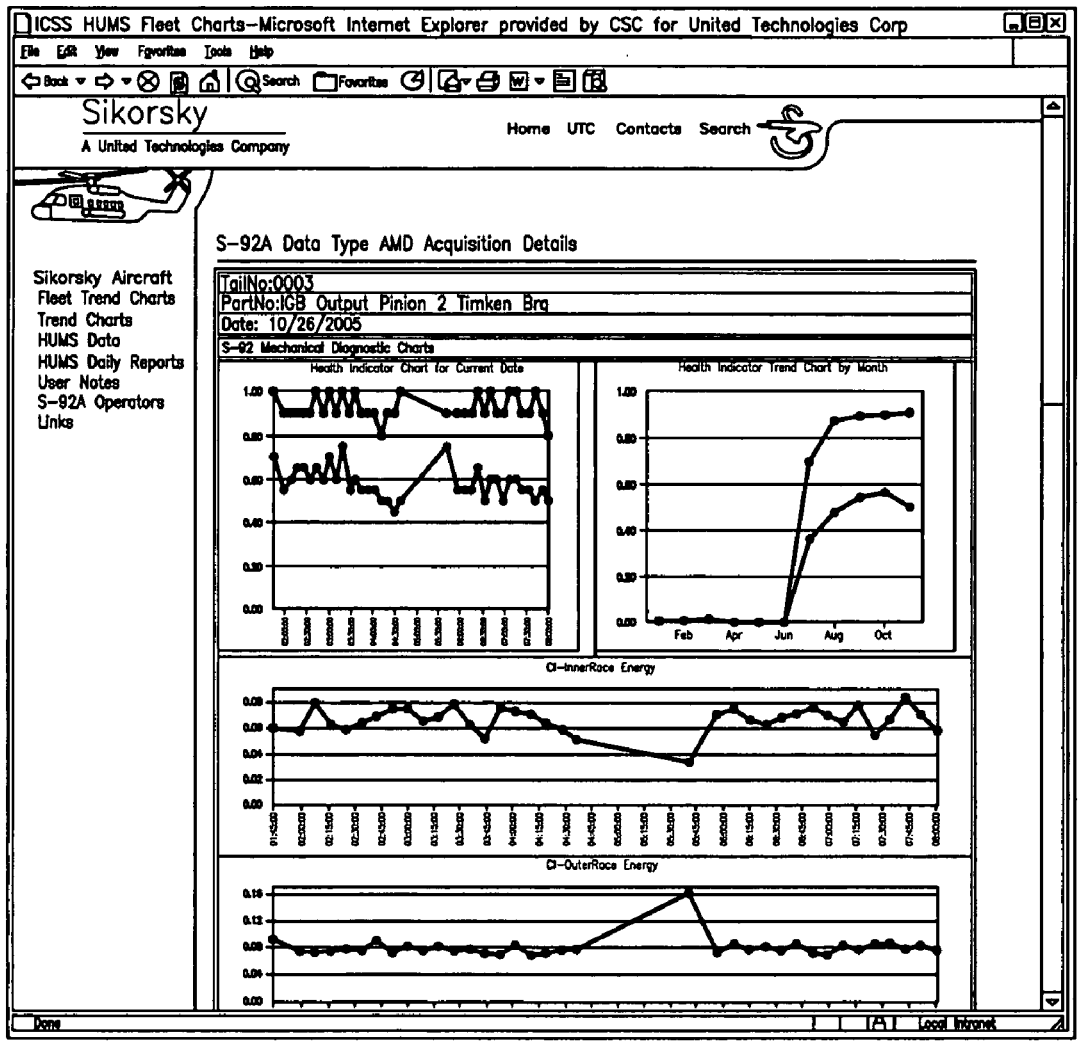
FIG. 11 is a web portal mechanical diagnostic acquisition view page.

Referring to FIG. 11, a Web Portal Mechanical Diagnostic Acquisition View page allows an end-user to view the Health and Condition Indicators in Mechanical diagnostics functions that causes an advisory to occur for a particular part number (for example per aircraft tail number). This page also provides a one year history of the Health Indicator, so the end-user can view trends.

In the illustrated view, the Health Indicator was low (~0) up to June and then rapidly increase towards the caution range (0.75). This indicates there is a problem with this particular component and that it should be evaluated.

Referring to FIG. 12, a Web Portal Detail of Regimes for Aircraft and Date page is accessed by selecting "Regimes" from the page shown in FIG. 7. This page provides a display of the flight regimes that where flown by a particular aircraft tail number on a specific date. As shown in this example, aircraft tail no. 0003 spent 65% of its time in Forward Flight at 0.9 Vne.

Figure 13:
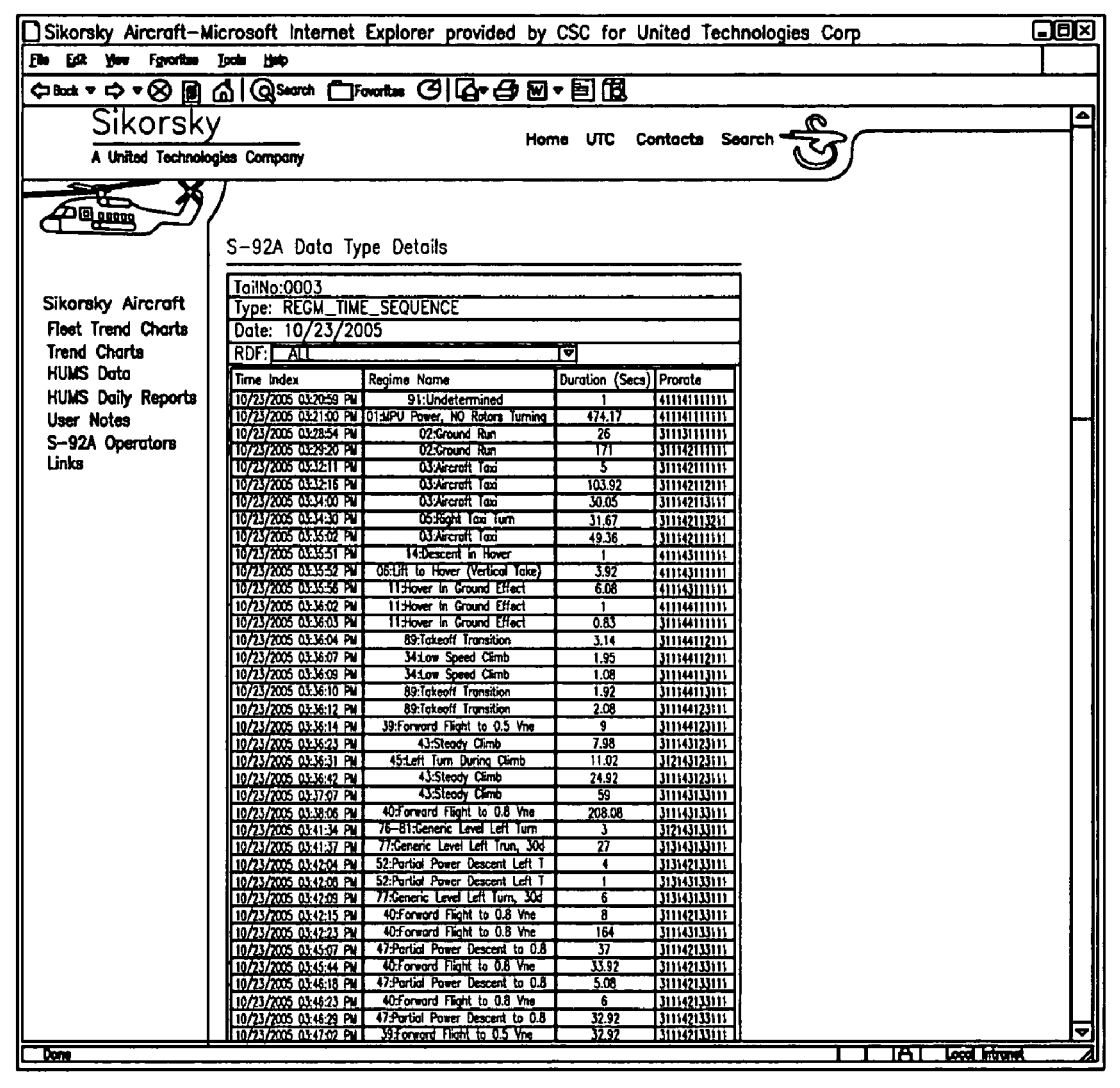

Referring to FIG. 13, a Web Portal Regime Acquisition View page is accessed by selecting Time Sequence from the page shown in FIG. 10. This page displays the flight regimes in time sequence order such that an entire flight may be played back.

Figure 14:
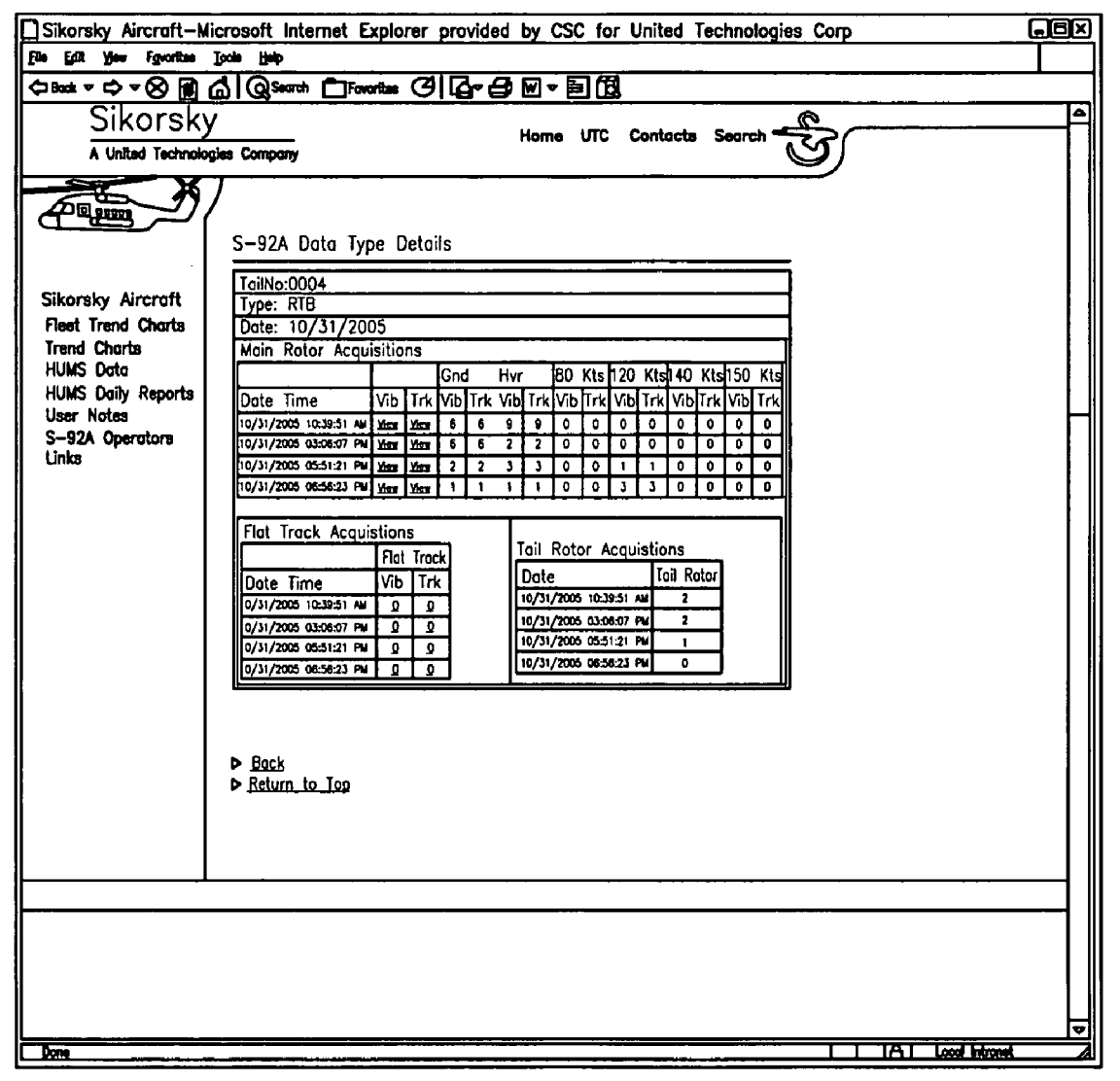

Referring to FIG. 14, a Web Portal RTB Vibration and Tracker Summary Acquisition Count page is accessed by selecting a number in the "RTB ACQ." Row from the page shown in FIG. 9. This page displays the summary totals of Rotor Track and Balance (RTB) acquisitions. The end-user can select the hyperlink to display vibration acquisitions (FIG. 15)—or track acquisitions (FIG. 18) for a particular data file.

Figure 15:
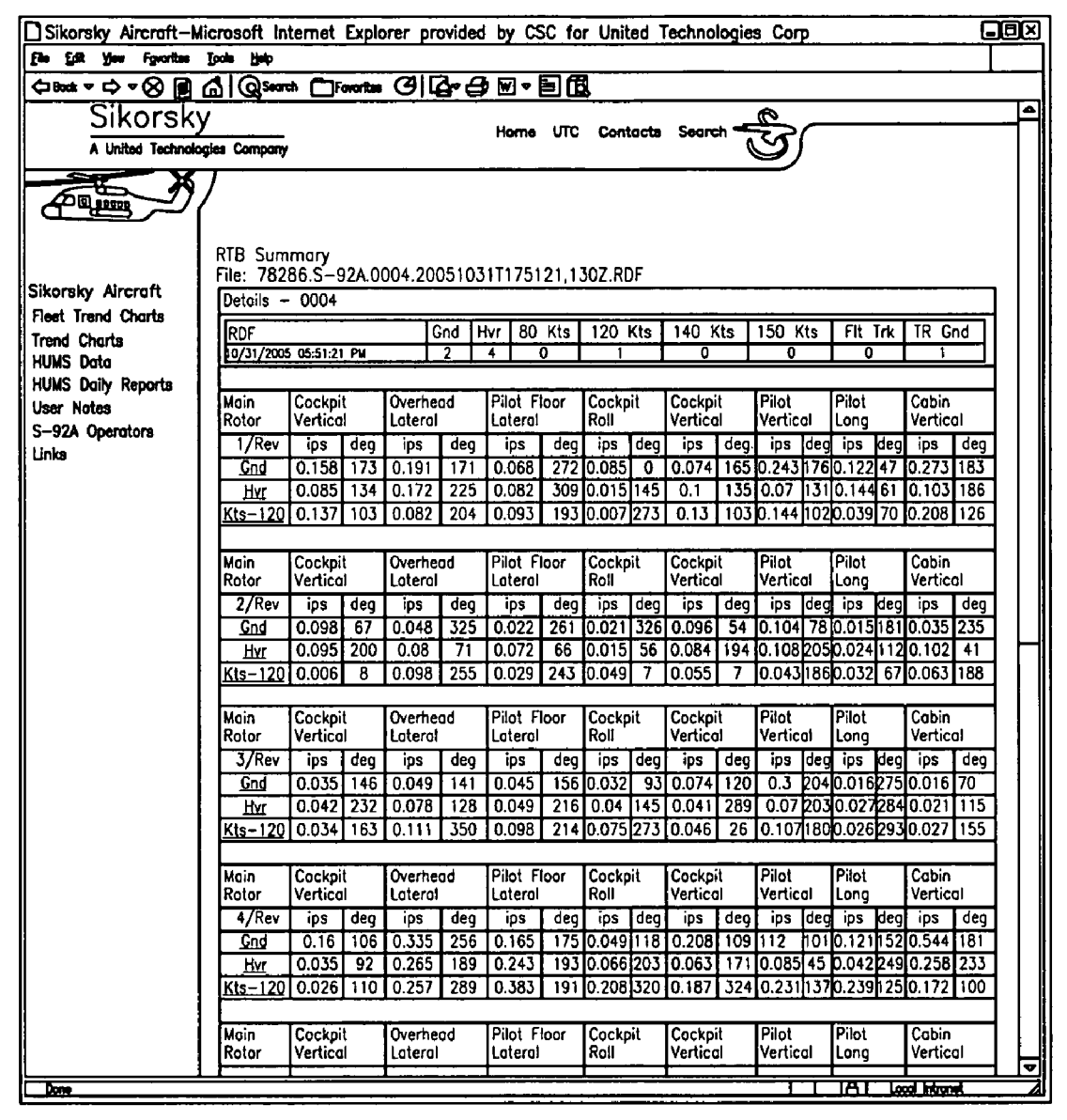

Referring to FIG. 15, a Web Portal RTB Vibration 1-8P Amplitude and Phase page is accessed by selecting one of the "Date Time" acquisitions from the page shown in FIG. 12. It displays the summary number of vibration acquisitions for a particular data file (Top). The tables below illustrate the vibration summary by airspeed for each rotor harmonic. The columns represent the accelerometer measurements (Amplitude and Phase) for each sensor or sensor combination.

Figure 16:
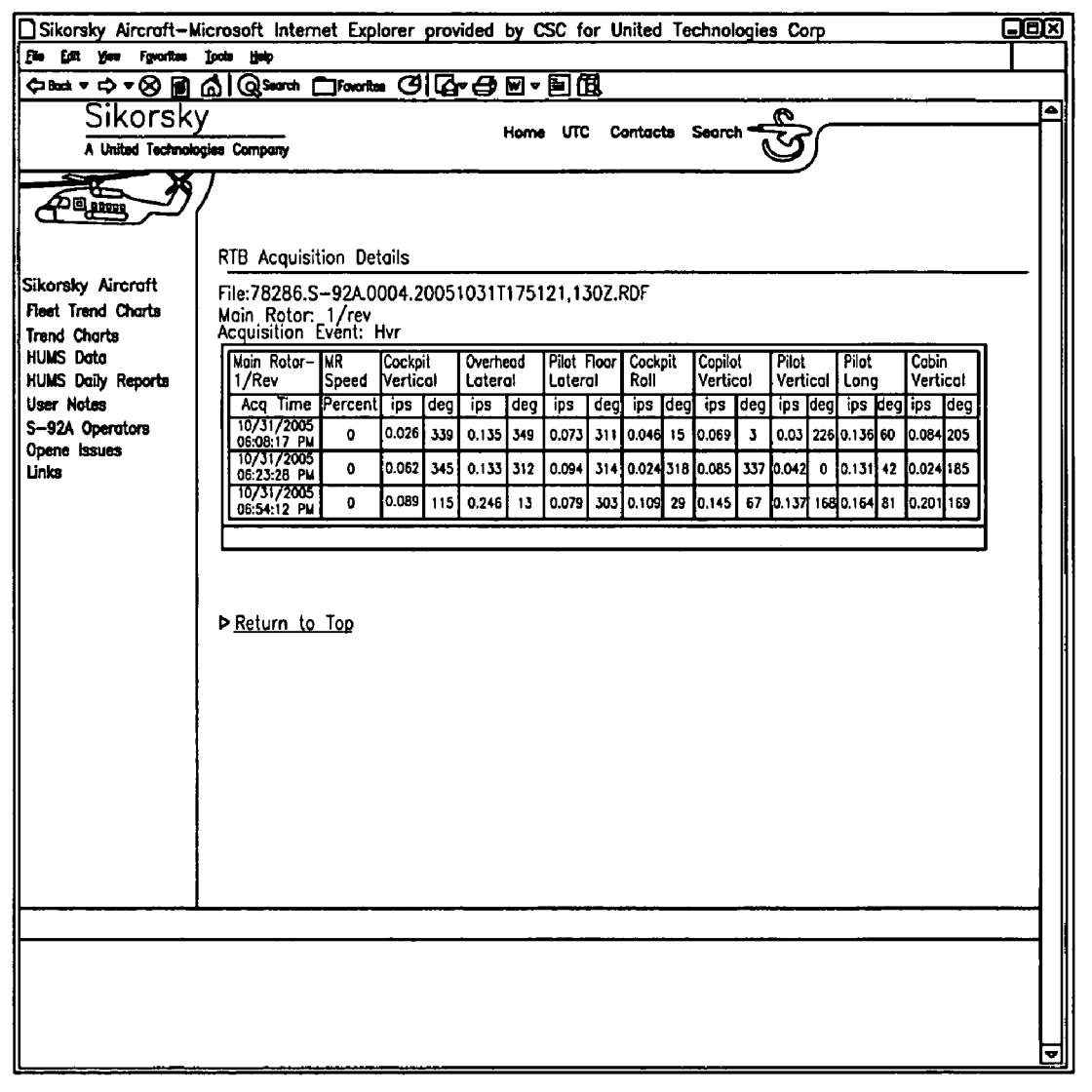

Referring to FIG. 16, a Detailed Acquisition of RTB Vibration Data page is accessed by selecting from the page shown in FIG. 15 and selecting a hyperlink by harmonic and airspeed (e.g., 1 per rev and airspeed in hover). This page displays the detailed acquisitions, in time sequence, that were acquired by the system. As with FIG. 15, the columns represent the accelerometer measurements (Amplitude and Phase) for each sensor or sensor combination (FIG. 15).

Referring to FIG. 17, a View RTB Tracker Summary Data page is accessed by selecting a Date Time from the page shown in FIG. 12 (e.g., Oct. 31, 2005 05:51:21 PM). This view displays the summary number of track acquisitions for a particular data file (Data File). The tables below illustrate the track summary by airspeed for each rotor track statistic. The columns represent the blade measurements (relative distance) for each blade.

Figure 18:
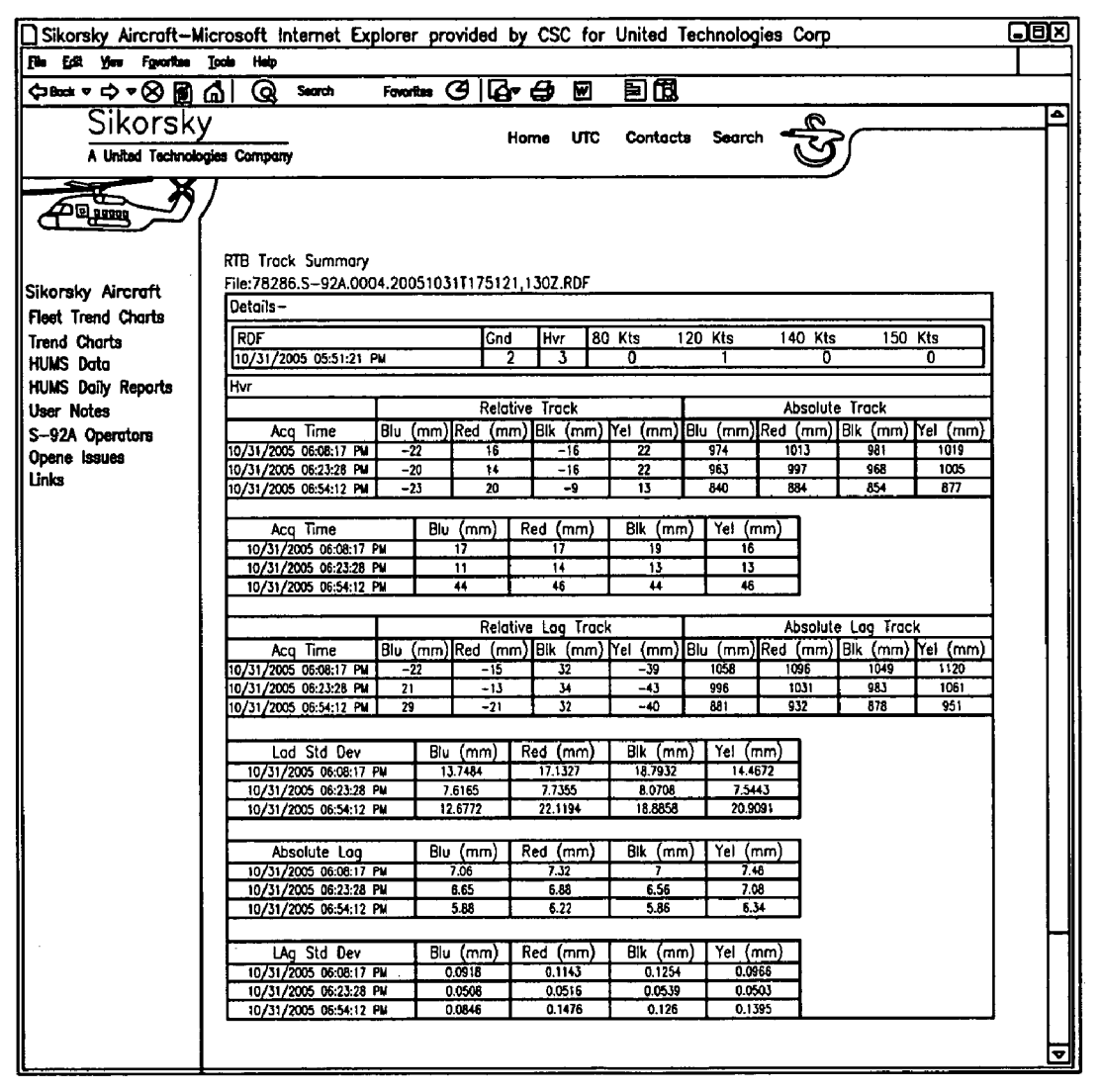

Referring to FIG. 18, a Detailed Acquisition of RTB Tracker Data page is accessed by selecting an airspeed (e.g., GND; HVR; 80KTS; 120KTS; 140KTS; 150 KTS) from the page shown in FIG. 17 (here HVR was selected). This page displays the summary number of track acquisitions for a particular data file ($RD^f$). The tables below it provide the detailed track acquisitions (time ordered) for the airspeed selected. As with the tables in FIG. 17, the columns represent the blade measurements (relative and absolute distance) for each blade.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:
1. A health and usage monitoring system comprising:
a health and usage monitoring system (HUMS) configured to access health and usage monitoring system (HUMS) data for a plurality of aircraft fleets, said system operable to selectively provide health and usage monitoring sys- tem (HUMS) data for a first of the plurality of aircraft fleets associated with a first end-user through a first end-user site;

health and usage monitoring system (HUMS) data for a second of the plurality of aircraft fleets associated with a second end-user through said second end-user site; and health and usage monitoring system (HUMS) trend data compiled from said first aircraft fleet and said second aircraft fleet to both said first end-user and said second end-user.

2. The system as recited in claim 1, wherein said system further comprises a first server operable to store compiled health and usage monitoring system (HUMS) data.

3. The system as recited in claim 2, wherein said system further comprising a second server in communication with said first server, said second server operable to store raw health and usage monitoring system (HUMS) data from the plurality of aircraft fleets.

4. The system as recited in claim 3, wherein said second server is operable to process the raw health and usage monitoring system (HUMS) data from the plurality of aircraft fleets to a common health and usage monitoring system (HUMS) data format to provide the health and usage monitoring system (HUMS) trend data.

5. A method of health and usage monitoring comprising the steps of:
(A) accessing health and usage monitoring system (HUMS) data from a multitude of end-users;
(B) compiling the health and usage monitoring system (HUMS) data;
(C) communicating data from said step (B) to all of said multitude of end-users as health and usage monitoring system (HUMS) trend data; and
(D) limiting aircraft specific health and usage monitoring system (HUMS) data to only that end-user which operates the aircraft associated with the aircraft specific health and usage monitoring system (HUMS) data.

6. A method as recited in claim 5, wherein said step (B) further comprises the step of:
(a) converting the health and usage monitoring system (HUMS) data from each of said multitude of end-users into a common health and usage monitoring system (HUMS) data format.

7. A method as recited in claim 5, further comprising the steps of:
(D) applying logic rules to the health and usage monitoring system (HUMS) data from each of said multitude of end-users to identify an anomaly; and (E) issuing an alert to a specific end-user in response to said step (D).

8. A method as recited in claim 7, wherein said step (E) further comprises the step of:
(a) issuing the alert to the specific end-user via email.

9. A method of health and usage monitoring comprising the steps of:
(A) accessing health and usage monitoring system (HUMS) data from a multitude of end-users;
(B) compiling the health and usage monitoring system (HUMS) data;
(C) limiting aircraft specific health and usage monitoring system (HUMS) data to only that end-user which operates the aircraft associated with the aircraft specific health and usage monitoring system (HUMS) data from the multiple of end-users in response to a request by that end user for aircraft specific health and usage monitoring system (HUMS) data; and
(D) communicating data from said step (B) to all of said multitude of end-users as health and usage monitoring system (HUMS) trend data.

10. The system as recited in claim 1, wherein said first end-user FI'P site is remote from said second end-user FTP site.

11. The system as recited in claim 1, wherein said first aircraft fleet includes a multiple of aircraft of a particular type and said second aircraft fleet includes a multiple of aircraft of said particular type.

12. The system as recited in claim 1, further comprising a first aircraft removable data storage device for each aircraft in said first aircraft fleet, each of said first aircraft removable data storage device operable to communicate with said first end-user FTP site and a second aircraft removable data storage device for each aircraft in said second aircraft fleet, each of said second aircraft removable data storage device operable to communicate with said second end-user FTP site.

13. A method as recited in claim 5, further comprising:
defining the multitude of end-users as at least a first aircraft fleet that includes a multiple of aircraft of a particular type and a second aircraft fleet that includes a multiple of aircraft of the particular type.

14. The method as recited in claim 1, wherein said system is operable to limit aircraft specific health and usage monitoring system (HUMS) data to only that end-user which operates the aircraft associated with the aircraft specific health and usage monitoring system (HUMS) data.

* * * * *